(12) United States Patent
Mouser et al.

(10) Patent No.: US 12,218,738 B2
(45) Date of Patent: Feb. 4, 2025

(54) REPEATER WITH CARRIER-SPECIFIC INFORMATION

(71) Applicant: Wilson Electronics, LLC, St. George, UT (US)

(72) Inventors: Michael James Mouser, Wylie, TX (US); Stephen Todd Fariss, Frisco, TX (US); Stephen McBride, North Ogden, UT (US); Philip Anthony Weaver, Plano, TX (US); Douglas Edward Bohls, Allen, TX (US); Christopher Ken Ashworth, Toquerville, UT (US); Dale Robert Anderson, Colleyville, TX (US); William Gerald Sarver, Jr., Plano, TX (US); Ilesh V. Patel, Euless, TX (US)

(73) Assignee: Wilson Electronics, LLC, St. George, UT (US)

( * ) Notice: Subject to any disclaimer, the term of this patent is extended or adjusted under 35 U.S.C. 154(b) by 235 days.

(21) Appl. No.: 17/135,863

(22) Filed: Dec. 28, 2020

(65) Prior Publication Data

US 2021/0203404 A1   Jul. 1, 2021

Related U.S. Application Data

(60) Provisional application No. 63/036,934, filed on Jun. 9, 2020, provisional application No. 62/955,749, filed on Dec. 31, 2019.

(51) Int. Cl.
*H04W 12/37* (2021.01)
*H04B 7/155* (2006.01)
(Continued)

(52) U.S. Cl.
CPC ........... *H04B 7/15528* (2013.01); *H04L 9/14* (2013.01); *H04W 12/037* (2021.01)

(58) Field of Classification Search
CPC ........... H04L 12/50; H04L 9/14; H04L 12/28; H04B 7/15528; H04W 12/037
(Continued)

(56) References Cited

U.S. PATENT DOCUMENTS 4,776,032 A   10/1988   Odate et al.
5,303,395 A   4/1994    Dayani
(Continued)

FOREIGN PATENT DOCUMENTS

EP   1525678 B1   7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Dang T Ton
(74) *Attorney, Agent, or Firm* — Thorpe North & Western LLP

(57) ABSTRACT

A technology is described for a repeater system configured to provide services via a cloud-computing environment. The repeater system can comprise an n-band repeater, wherein n is a positive integer greater than 0; a server port; a donor port; one or more processors and memory in communication with the n-band repeater; and a scanning receiver coupled to the one or more processors and memory, wherein the scanning receiver is configured to scan one or more of the n bands of the n-band repeater and communicate carrier-specific information for the one or more of the n bands to a computer server located in the cloud-computing environment to enable access to the carrier-specific information from the cloud-computing environment.

28 Claims, 26 Drawing Sheets

(51) Int. Cl.
    *H04L 9/14*         (2006.01)
    *H04W 12/037*    (2021.01)

(58) Field of Classification Search
    USPC .......................................................... 370/329
    See application file for complete search history.

(56) References Cited

U.S. PATENT DOCUMENTS

| | | | |
|---|---|---|---|
| 5,737,687 | A | 4/1998 | Martin et al. |
| 5,777,530 | A | 7/1998 | Nakatuka |
| 5,835,848 | A | 11/1998 | Bi et al. |
| 6,005,884 | A | 12/1999 | Cook et al. |
| 6,711,388 | B1 | 3/2004 | Neitiniemi |
| 6,889,033 | B2 | 5/2005 | Bongfeldt |
| 6,990,313 | B1 | 1/2006 | Yarkosky |
| 7,035,587 | B1 | 4/2006 | Yarkosky |
| 7,221,967 | B2 | 5/2007 | Van Buren et al. |
| 7,558,575 | B2 | 7/2009 | Losh et al. |
| 7,974,573 | B2 | 7/2011 | Dean |
| 2002/0044594 | A1 | 4/2002 | Bongfeldt |
| 2003/0123401 | A1 | 7/2003 | Dean |
| 2004/0137854 | A1 | 7/2004 | Ge |
| 2004/0146013 | A1 | 7/2004 | Song et al. |
| 2004/0166802 | A1 | 8/2004 | McKay, Sr. et al. |
| 2004/0219876 | A1 | 11/2004 | Baker et al. |
| 2004/0235417 | A1 | 11/2004 | Dean |
| 2005/0118949 | A1 | 6/2005 | Allen et al. |
| 2006/0084379 | A1 | 4/2006 | O'Neill |
| 2007/0071128 | A1 | 3/2007 | Meir et al. |
| 2007/0188235 | A1 | 8/2007 | Dean |
| 2008/0081555 | A1 | 4/2008 | Kong et al. |
| 2008/0096483 | A1 | 4/2008 | Van Buren et al. |
| 2008/0278237 | A1 | 11/2008 | Blin |
| 2010/0297994 | A1 | 11/2010 | Law et al. |
| 2010/0311480 | A1 | 12/2010 | Raines et al. |
| 2011/0151775 | A1 | 6/2011 | Kang et al. |
| 2017/0135117 | A1 | 5/2017 | Raggio et al. |
| 2018/0092114 | A1 | 3/2018 | Ashworth et al. |
| 2019/0327625 | A1 | 10/2019 | Patel et al. |
| 2021/0143893 | A1 | 5/2021 | Taneja et al. |
| 2021/0409106 | A1* | 12/2021 | Ashworth ................ H04L 5/14 |

OTHER PUBLICATIONS

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; (2001); Data Sheet; 218 pages.

\* cited by examiner

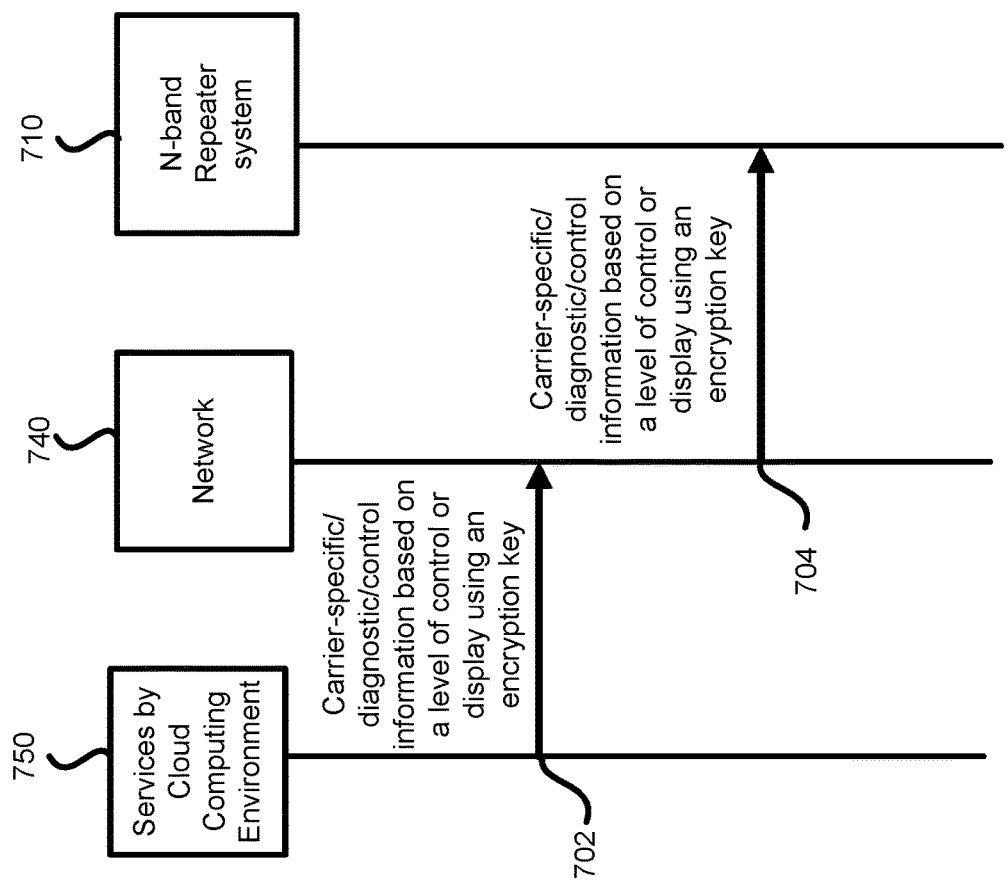

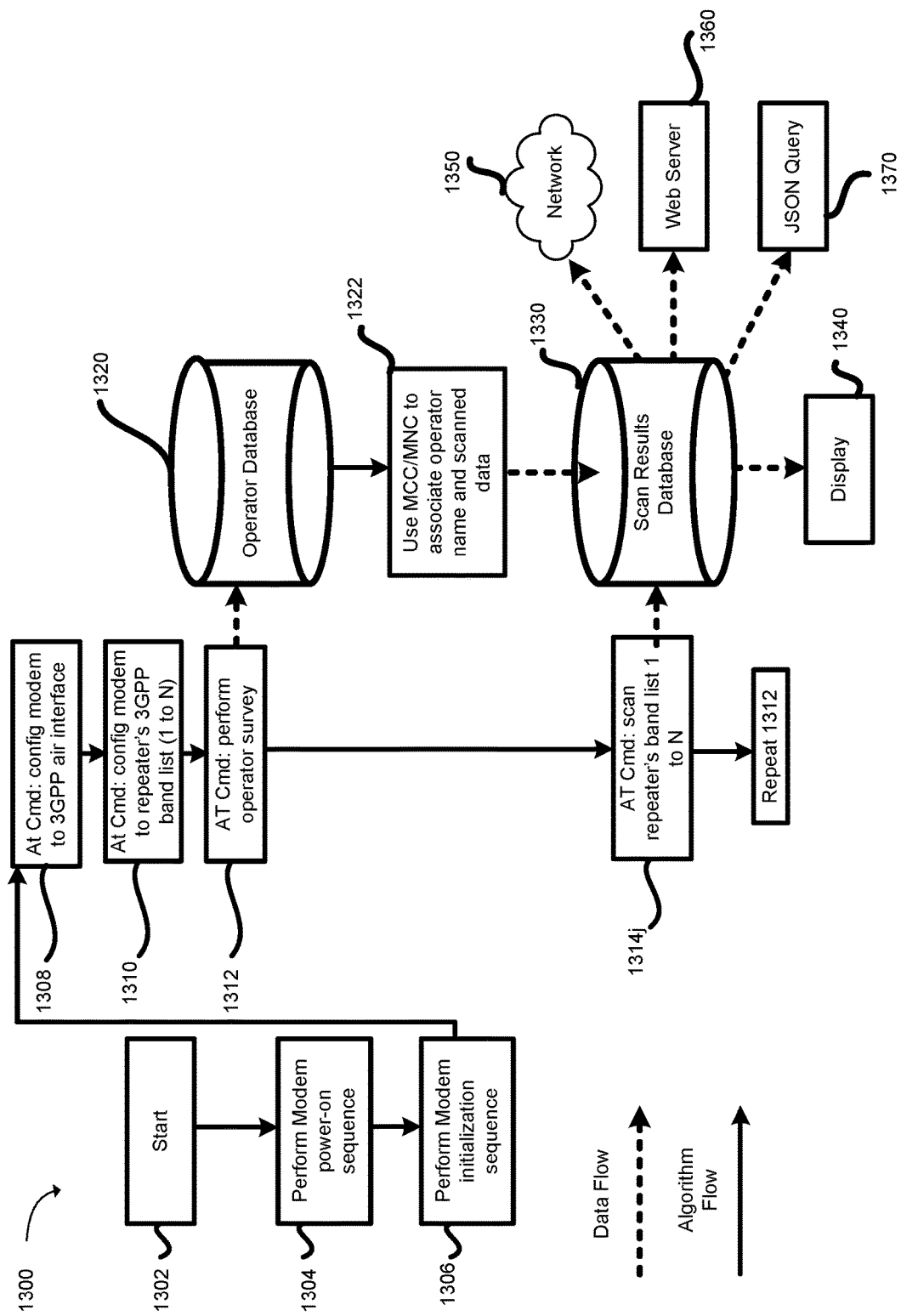

REPEATER WITH CARRIER-SPECIFIC INFORMATION

PRIORITY CLAIM(S) AND RELATED APPLICATION(S)

Priority is claimed to U.S. Provisional Patent Application Ser. No. 62/955,749, filed Dec. 31, 2019 and U.S. Provisional Patent Application Ser. No. 63/036,934, filed Jun. 9, 2020, which are both hereby incorporated herein by reference in their entirety.

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure, and, wherein:

FIG. 7a illustrates a repeater system configured to provide services via a cloud-computing environment in accordance with an example;

FIG. 13c depicts functionality of a scanning receiver in accordance with an example;

Figure 1:
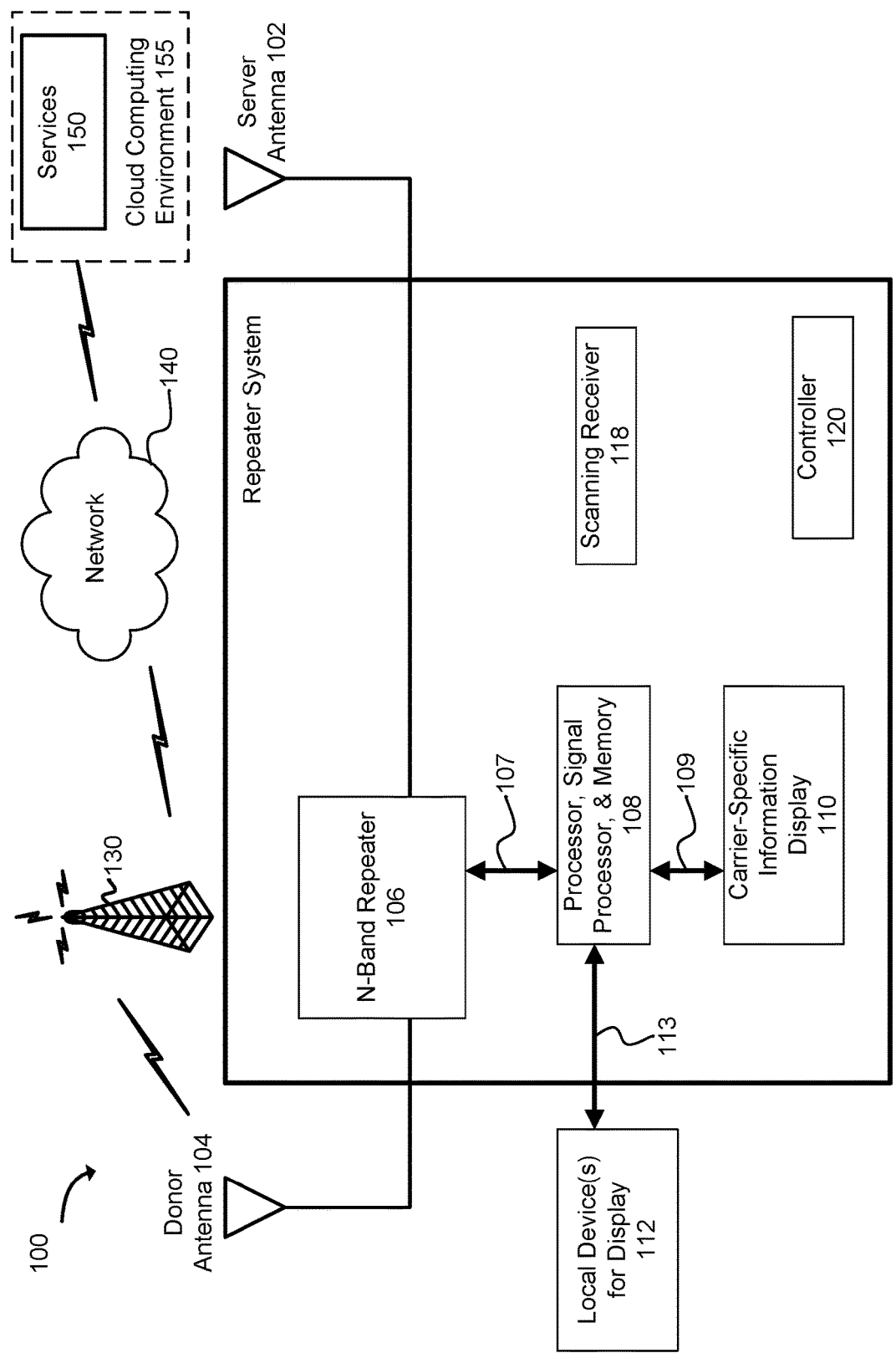
FIG. 1 illustrates a wideband repeater system configured to provide services via a cloud-computing environment in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Repeaters can increase the quality of wireless communication between a wireless device and a wireless communication access point by amplifying, filtering, or applying other processing techniques to uplink and downlink signals communicated between the wireless device and the wireless communication access point.

Repeaters can be difficult for a user to install and maintain in subsequent operation. For example, during installation of the repeater, a user may not have adequate information or experience to determine why the repeater is unable to properly operate. In such a scenario, the user can call a technician at a remote location to provide installation assistance. However, the technician might have to go to the installation location to finish installation when the user is unable to provide sufficient information or adequately follow directions. Repeaters can also be difficult for a user to properly operate subsequent to installation. For example, antenna positioning, oscillation mitigation, near-far resolution, and interference resolution may be difficult for a user to properly address without the assistance of a technician.

Repeaters typically do not remotely provide all of the information that can be used for assistance in installation and subsequent operation. For example, carrier-specific information may not be shown remotely to a user or a technician. Without remote access to the carrier-specific information, neither users nor technicians can install or maintain the operation of a repeater without difficulty.

Therefore, remote monitoring and reporting of carrier-specific information can reduce the difficulty involved in installation and maintenance of repeaters. In the case of consumer signal boosters, remote monitoring can be included as part of a subscription service. Such a subscription service can be implemented when carrier-specific information can be communicated from a repeater to a network or a display. In one example, the carrier-specific information can be communicated via: a repeater with signal processing capabilities; a scanning receiver; or a local device in communication with the repeater.

In one example, as illustrated in FIG. 1, a repeater system can comprise: an n-band repeater 106, one or more processors and memory 108, and a carrier-specific information display 110. The one or more processors and memory 108 can be configured to be coupled to a local device (e.g., a user equipment (UE)) via a wired or wireless interface 113. The n-band repeater 106 can comprise a donor port and a server port. The donor port can be configured to be connected to a donor antenna 104. The server port can be configured to be connected to a server antenna 102.

The n-band repeater 106 can comprise: one or more downlink amplification and filtering paths, and one or more uplink amplification and filtering paths. Each of the one or more downlink amplification and filtering paths can be configured to pass one or more frequency ranges of a downlink direction. Each of the one or more uplink amplification and filtering paths can be configured to pass one or more frequency ranges of an uplink direction. The n-band repeater can be configured to operate on n frequency bands, wherein n is a positive integer.

In one example, the repeater system can be a wideband repeater system configured to provide services 150 via a cloud-computing environment 155. The one or more processors and memory 108 can be configured to communicate with the n-band repeater 106 via an interface 107. The one or more processors and memory 108 can be configured to communicate with a carrier-specific information display 110 via an interface 109.

In one example, "wideband" can include the FCC definition of wideband for a consumer signal booster, as defined by the United States Federal Communication Commission, or another state or national entity in a specific country. In an example, a "wideband repeater" can be configured to operate simultaneously on one or more frequencies in an area for a plurality of commercial mobile radio services (CMRS) licensees, wherein a plurality of uplink and downlink bands can be configured.

In one example, the repeater system can comprise: a scanning receiver 118 and a controller 120. The scanning receiver 118 can be one or more of a modem, a field-programmable gate array (FPGA), or an application-specific integrated circuit (ASIC). The scanning receiver 118 can be configured to be coupled to the one or more processors and memory 108. The scanning receiver 118 can be configured to scan one or more of the n bands of the n-band booster 106. The scanning receiver 118 can be configured to communicate carrier specific information for the one or more of the n bands to a base station 130 for communication to a server located in the cloud-computing environment 155 via a network 140.

In one example, the carrier specific information can include carrier-specific information for a plurality of carriers in each band of the one or more of the n bands of the n-and repeater. The carrier specific information can be determined from one or more of a downlink signal received via the donor port, an uplink signal received via the server port, or the one or more processors and memory 108. The carrier-specific information can include one or more of: a carrier name, one or more operating frequencies, one or more channels, a direction of a cell tower from the n-band repeater, a location of a cell tower for the n-band repeater, a time and date of transmission, a reference signal received power (RSRP), a reference signal received quality (RSRQ), a received signal strength indicator (RSSI), an arbitrary strength unit (ASU), a reference signal (RS) signal to noise ratio (SNR) (RSSNR), an evolved-UMTS Terrestrial Radio Access Network (E-UTRAN) cell identifier (ECI), or a tracking area code (TAC).

In one example, the controller 120 can be configured to communicate with the one or more processors and memory 108 and the cloud-computing environment 155. The controller 120 can be configured to control services 150 provided by the wideband repeater system via the server in the cloud computing environment 155 using one or more encryption keys.

In one example, a method for providing n-band repeater services 150 via a cloud-computing environment 155 can comprise: coupling one or more bands of an n-band repeater 106 in a received signal to a scanning receiver 118. The method can further comprise: determining the carrier specific information for the one or more bands. The method can further comprise: communicating the carrier-specific information for the n-band repeater 106 to a server in a cloud-computing environment 155. The method can further comprise: controlling display of the carrier-specific information using one or more encryption keys associated with a subscription service. Controlling the display of the carrier-specific information can include controlling the communication of the carrier-specific information. In one example, the carrier-specific information may only be communicated to a user with an appropriate encryption key for the subscription service. The method can further comprise: controlling the n-band repeater 106 via the cloud-computing environment 155 using the one or more encryption keys associated with the subscription service. For example, control information may only be communicated from the cloud-computing environment 155 to the n-band repeater 106 or repeater system 100 when a user has an appropriate encryption key for the subscription service.

Figure 2:
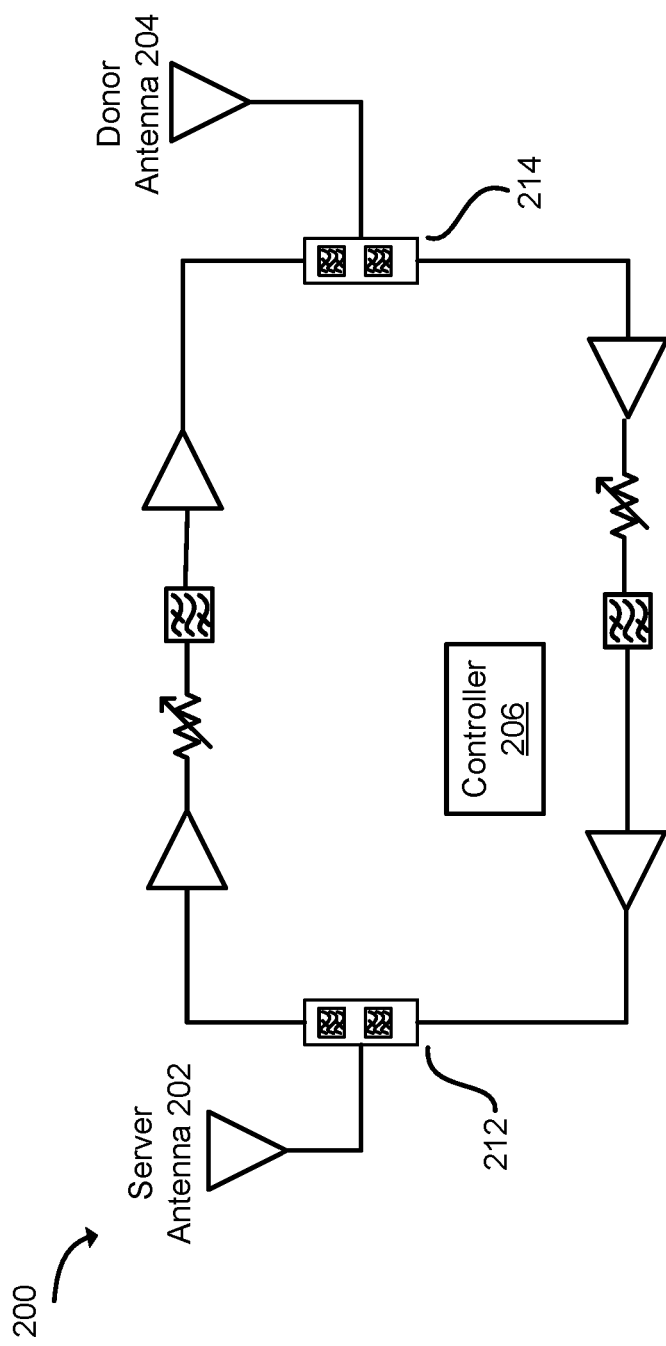
FIG. 2 illustrates a repeater in accordance with an example.

In an example, as illustrated in FIG. 2, a bi-directional repeater system can comprise a repeater 200 connected to a donor antenna 204 and a server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. The PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 206. In one example, the controller 206 can include one or more processors and memory.

In some embodiments the controller 206 can adjust the gain of the first path and/or the second path based on wireless communication conditions. If included in the repeater 200, the controller 206 can be implemented by any suitable mechanism, such as a program, software, function, library, software as a service, analog or digital circuitry, or any combination thereof. The controller 206 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the first path and/or the second path. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

Figure 3:
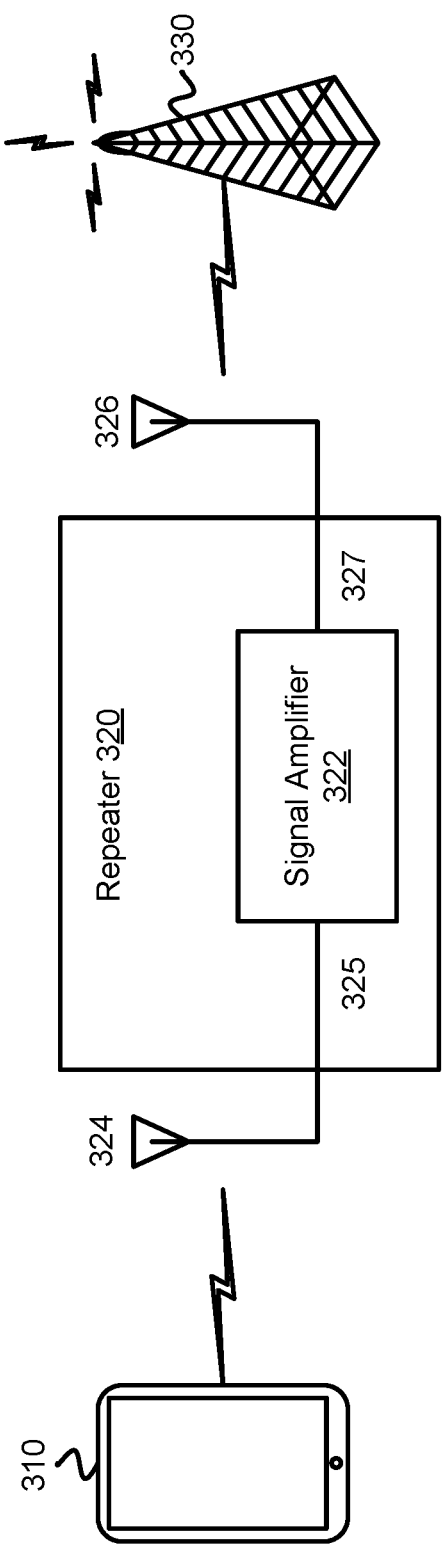
FIG. 3 illustrates a repeater in communication with a user equipment (UE) and a base station (BS) in accordance with an example.

FIG. 3 illustrates an exemplary repeater 320 in communication with a wireless device 310 and a base station 330. The repeater 320 (also referred to as a cellular signal amplifier) can increase the quality of wireless communication by amplifying, filtering, and/or applying other processing techniques via a signal amplifier 322 to uplink signals communicated from the wireless device 310 to the base station 330 and/or downlink signals communicated from the base station 330 to the wireless device 310. In other words, the repeater 320 can amplify or boost uplink signals and/or downlink signals bi-directionally. In one example, the repeater 320 can be at a fixed location, such as in a home or office. Alternatively, the repeater 320 can be attached to a mobile object, such as a vehicle or a wireless device 310. The repeater can be a signal booster, such as a cellular signal booster.

In one configuration, the repeater 320 can be configured to be connected to a device antenna 324 (e.g., an inside antenna, server antenna, or a coupling antenna) and a node antenna 326 (e.g., an outside antenna or donor antenna). The node antenna 326 can receive the downlink signal from the base station 330. The downlink signal can be provided to the signal amplifier 322 via a second coaxial cable 327 or other type of wired, wireless, optical, or radio frequency connection operable to communicate radio frequency signals. The signal amplifier 322 can include one or more radio signal amplifiers for amplification and filtering of cellular signals. The downlink signal that has been amplified and filtered can be provided to the device antenna 324 via a first coaxial cable 325 or other type of radio frequency connection operable to communicate radio frequency signals. The device antenna 324 can communicate the downlink signal that has been amplified and filtered to the wireless device 310.

Similarly, the device antenna 324 can receive an uplink signal from the wireless device 310. The uplink signal can be provided to the signal amplifier 322 via the first coaxial cable 325 or other type of wired, wireless, optical, or radio frequency connection operable to communicate radio frequency signals. The signal amplifier 322 can include one or more radio signal amplifiers for amplification and filtering of cellular signals. The uplink signal that has been amplified and filtered can be provided to the node antenna 326 via the second coaxial cable 327 or other type of wired, wireless, optical, or radio frequency connection operable to communicate radio frequency signals. The node antenna 326 can communicate the uplink signal that has been amplified and filtered to a node, such as a base station 330.

In one embodiment, the device antenna 324 and the node antenna 326 can be integrated as part of the repeater 320. Alternatively, the repeater 320 can be configured to be connected to a separate device antenna 324 or node antenna 326. The device antenna and the node antenna may be provided by a different provider than the repeater 320.

In one example, the repeater 320 can send uplink signals to a node and/or receive downlink signals from the node. While FIG. 3 shows the node as a base station 330, this is not intended to be limiting. The node can comprise a wireless wide area network (WWAN) access point (AP), a base station (BS), an evolved Node B (eNB), a next generation Node B (gNB), a new radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the repeater 320 can include a battery to provide power to various components, such as the signal amplifier 322, the device antenna 324, and the node antenna 326. The battery can also power the wireless device 310 (e.g., phone or tablet). Alternatively, the repeater 320 can receive power from the wireless device 310.

In one configuration, the repeater 320 can be a Federal Communications Commission (FCC)-compatible consumer repeater. As a non-limiting example, the repeater 320 can be compatible with FCC Part 20 or 47 Code of Federal Regulations (C.F.R.) Part 20.21 (Apr. 18, 2018). In addition, the handheld booster can operate on the frequencies used for the provision of subscriber-based services under parts 22 (Cellular), 24 (Broadband PCS), 27 (AWS-1, 700 megahertz (MHz) LowerA-E Blocks, and 700 MHz Upper C Block), and 90 (Specialized Mobile Radio) of 47 C.F.R. The repeater 320 can be configured to automatically self-monitor its operation to ensure compliance with applicable noise and gain limits. The repeater 320 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 320 can enhance the wireless connection between the wireless device 310 and the base station 330 (e.g., cell tower) or another type of wireless wide area network (WWAN) access point (AP) by amplifying desired signals relative to a noise floor. The repeater 320 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 320 can boost signals for 3GPP LTE Release 16.3.0 (September 2019) or other desired releases.

The repeater 320 can boost signals from the 3GPP Technical Specification (TS) 36.101 (Release 16 Sep. 2019) bands or LTE frequency bands. For example, the repeater 320 can boost signals from the LTE frequency bands: 2, 4, 5, 12, 13, 17, 25, and 26. In addition, the repeater 320 can boost selected frequency bands based on the country or region in which the repeater is used, including any of bands 1-53, 65-76, 85, 87, or 88, or other bands, as disclosed in 3GPP TS 36.104 V16.3.0 (September 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz 2620 MHz | FDD (NOTE 2) |
| 70 | 1695 MHz-1710 MHz | 1995 MHz-2020 MHz | FDD6 |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

NOTE 1:
Band 6, 23 are not applicable.

NOTE 2:
Restricted to E-UTRA operation when carrier aggregation is configured. The downlink operating band is paired with the uplink operating band (external) of the carrier aggregation configuration that is supporting the configured Pcell.

NOTE 3:
This band is an unlicensed band restricted to licensed-assisted operation using Frame Structure Type 3.

NOTE 4:
Band 46 is divided into four sub-bands as in Table 5.5-1A.

NOTE 5:
The range 2180-2200 MHz of the DL operating band is restricted to E-UTRA operation when carrier aggregation is configured.

NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.

NOTE 7:
Void

NOTE 8:
This band is restricted to licensed-assisted operation using Frame Structure Type 3.

In another configuration, the repeater 320 can boost signals from the 3GPP Technical Specification (TS) 38.104 (Release 16 September 2019) bands or 5G frequency bands. In addition, the repeater 320 can boost selected frequency bands based on the country or region in which the repeater is used including any of bands n1-n86 in frequency range 1 (FR1), n257-n261 in frequency range 2 (FR2), or other bands, as disclosed in 3GPP TS 38.104 V16.1.0 (September 2019), and depicted in Table 2 and Table 3:

TABLE 2

| NR operating band | Uplink (UL) operating band BS receive/ UE transmit $F_{UL,low}$-$F_{UL,high}$ | Downlink (DL) operating band BS transmit/ UE receive $F_{DL,low}$-$F_{DL,high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Figure 4:
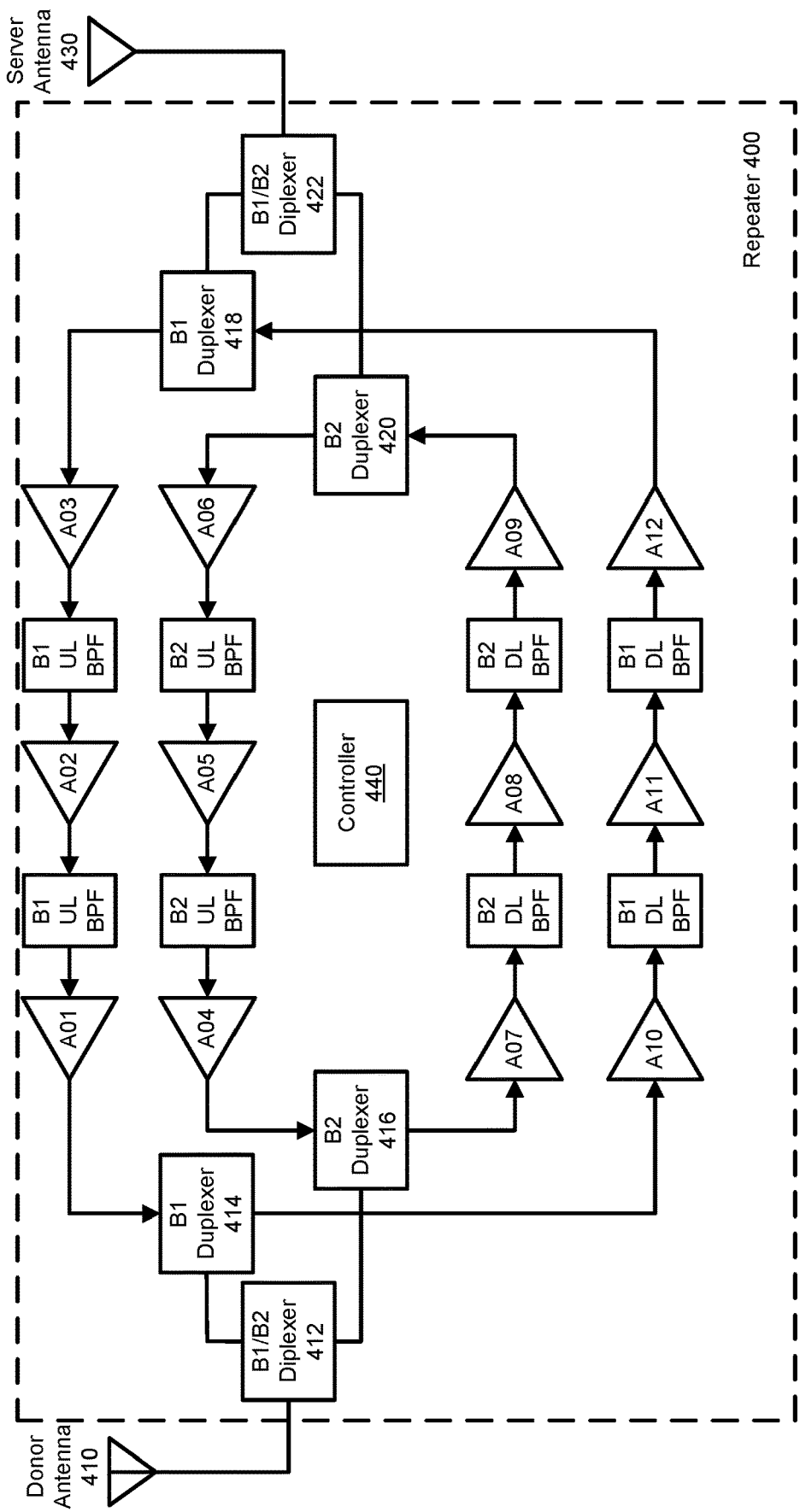
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

Figure 5A:
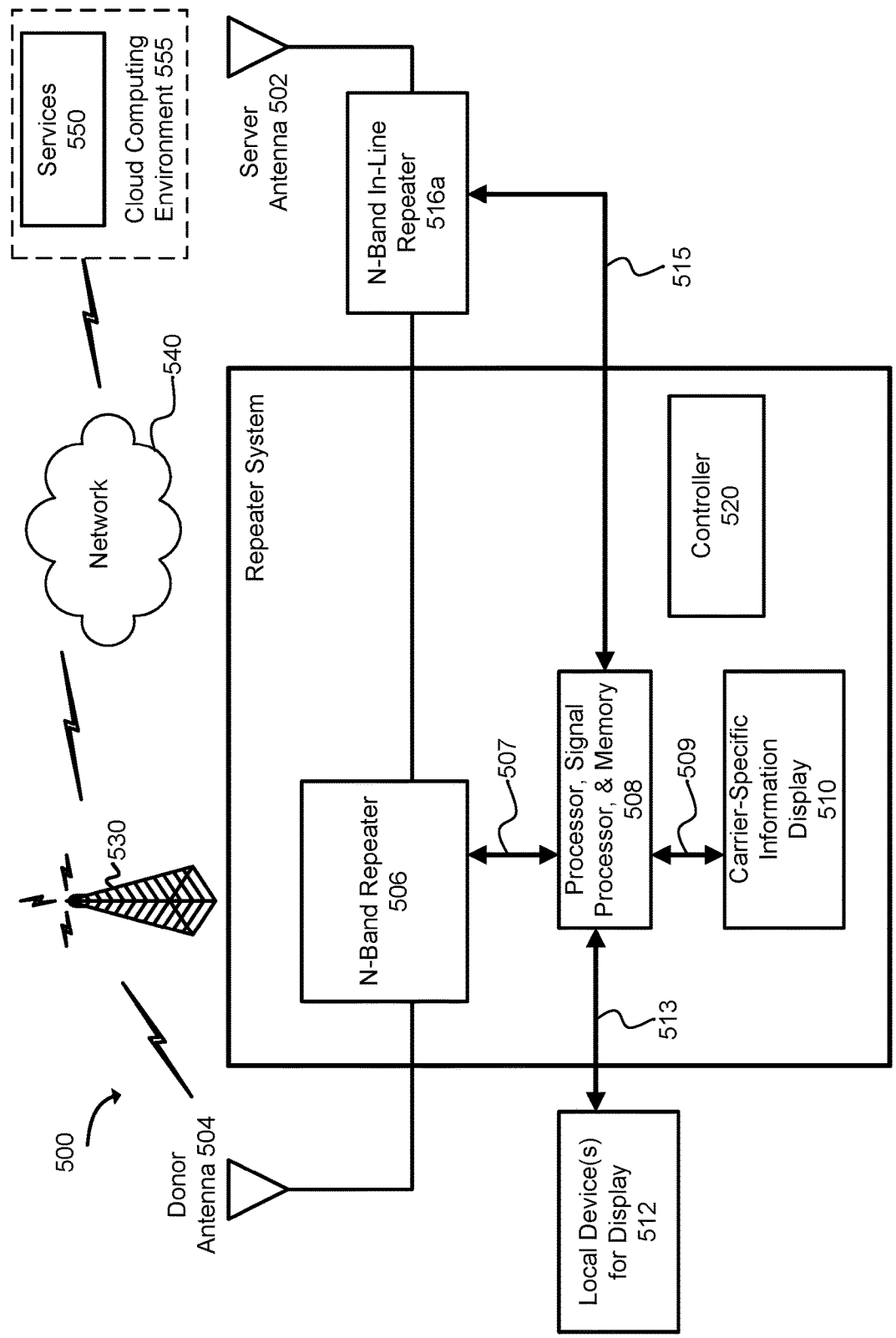
FIG. 5a illustrates a repeater system configured to provide services via a cloud-computing environment in accordance with an example.

In another example, as illustrated in FIG. 5*a*, a wideband repeater system 500 can be configured to provide services 550 via a cloud-computing environment 555. The wideband repeater system 500 can comprise: an n-band repeater 506;

one or more processors, signal processors, or memory 508; and a carrier-specific information display 510. For purposes of this disclosure, the terms "cloud-computing environment" and "computing service environment" can be deemed interchangeable.

In another example, the one or more processors, signal processors, or memory 508 can be configured to be connected to a local device for display 512 via a wired or wireless interface 513. The one or more processors, signal processors, or memory 508 can be configured to be connected to a carrier-specific information display 510 via a wired or wireless interface 509. The one or more processors, signal processors, or memory 508 can be configured to be connected to the n-band repeater 506 via an interface 507. The one or more processors, signal processors, or memory 508 can be configured to be connected to an n-band in-line repeater 516a via a wired or wireless interface 515.

In another example, the n-band repeater 506 can comprise a donor port and a server port. The donor port can be configured to be connected to a donor antenna 504. The server port can be configured to be connected to a server antenna 502.

The donor antenna 504 can be configured to transmit an uplink signal from the donor port of the n-band repeater 506 to a base station 530. The donor antenna 504 can be configured to receive a downlink signal from the base station 530 for communication to the donor port of the n-band repeater 506.

The server antenna 502 can be configured to transmit a downlink signal from the server port of the n-band repeater 506 to a user equipment (UE). The server antenna 502 can be configured to receive an uplink signal from the UE for communication to the server port of the n-band repeater 506.

In another example, the n-band repeater 506 can comprise: one or more downlink amplification and filtering paths, and one or more uplink amplification and filtering paths. Each of the one or more downlink amplification and filtering paths can be configured to pass one or more frequency ranges of a downlink direction. Each of the one or more uplink amplification and filtering paths can be configured to pass one or more frequency ranges of an uplink direction. The n-band repeater 506 can be configured to operate on n frequency bands, wherein n is a positive integer.

In another example, the n-band repeater can be configured to be compatible with regulations defined for consumer signal boosters. In one example, the regulations defined for consumer signal boosters can include 47 Code of Federal Regulations (CFR) Part 20.21 (Apr. 18, 2018).

In another example, the wideband repeater system can further comprise a controller 520. The controller 520 can be configured to communicate with the one or more processors, signal processors, or memory 508. The controller can be configured to communicate with a cloud-computing environment 555 via a network 540.

In another example, the controller 520 can be operable to control services 550 provided by the wideband repeater system via a server in the cloud-computing environment 555. In one example, the controller can be configured to control services 550 provided by the wideband repeater system via the server in the cloud-computing environment 555 using one or more encryption keys.

In another example, the "services" can include one or more of "controllable functions", services related to monitoring of carrier-specific information, or any other services defined in this disclosure that can be received or provided by the wideband repeater system.

In another example, the services 550 provided by the wideband repeater system that can be controlled via the server in the cloud-computing environment 555 can include controllable functions including control of one or more of: a position of one or more antennas associated with the n-band repeater; a repeater gain of the n-band repeater; an activation or deactivation of one or more of a donor port of the n-band repeater or a server port of the n-band repeater; an activation or deactivation of one or more amplification and filtering paths for one or more operating bands of the n-band repeater, wherein the operating bands include one or more of a Third Generation Partnership Project (3GPP) long term evolution (LTE) frequency band or a 3GPP fifth generation (5G) frequency band; an increase or decrease of a repeater output power of the n-band repeater; an increase or decrease of a network protection level of the n-band repeater; an activation or deactivation of one or more carriers associated with the n-band repeater; a filtering of one or more channels of one or more of a 3GPP LTE frequency band or a 3GPP 5G frequency band to provide filtering for the one or more channels; or a channel selection, an operating band selection, or a carrier gain level based on a time of a day.

In another example, the services 550 provided by the wideband repeater system that can be monitored via the server in the cloud-computing environment 555 can include monitoring of carrier-specific information for the one or more of the n bands to a server located in the cloud-computing environment 555 to enable access to the carrier-specific information from the cloud-computing environment 555. The services 550 can further include: a retrieval of cell signal logs or statistics for one or more of a 3GPP LTE frequency band or a 3GPP 5G frequency band; an identification of one or more of a donor port carrier frequency, a server port carrier frequency, a reference signal received power (RSRP), a reference signal received quality (RSRQ), or a signal to interference-plus-noise ratio (SINR); a monitoring of one or more of in-band radio frequency (RF) activity or adjacent band RF activity; a firmware update of the n-band repeater; or a monitoring of uninterruptible power source (UPS) logs.

In another example, the controller 520 can be configured to send carrier-specific information for the one or more bands of the n bands of the n-band repeater 506 to a first display (e.g., a local device for display 512, a carrier-specific information display 510, an integrated display, a mobile display, or a remote display).

In another example, the controller 520 can be configured to send for monitoring and/or display one or more of: (a) a first level of information of the carrier-specific information for the one or more n bands of the n-band repeater 506 using a first encryption key of the one of more encryption keys; a second level of information of the carrier-specific information for the one or more n bands of the n-band repeater 506 using a second encryption key of the one of more encryption keys; an $m^{th}$ level of information of the carrier-specific information for the one or more n bands of the n-band repeater 506 using an $m^{th}$ encryption key of the one of more encryption keys, wherein m can be a positive integer greater than 2.

In another example, the controller 520 can be configured to provide one or more of: a first level of control of selected functions of the n-band repeater 506 via the server of the cloud-computing environment 555; a second level of control of selected functions of the n-band repeater 506 via the server of the cloud-computing environment 555; a $p^{th}$ level of control of selected functions of the n-band repeater 506 via the server of the cloud-computing environment 555, wherein p can be a positive integer greater than 2.

In another example, the one or more encryptions keys can be used to control display of the carrier specific information. The one or more encryption keys can be used to control the n-band repeater 506 via the cloud-computing environment 555.

In another example, the one or more encryption keys can be associated with a subscription service. In another example, the subscription service can be based on customer account information. In another example, a customer, a subscriber, or a user can receive access to a level of information of the carrier-specific information based on username or password authentication, or a permission level associated with the username and password. As discussed in the proceeding and with reference to FIG. 12, a deployment component 1222 may be used to assist customers in the deployment of computing instances 1204a-d. The deployment component 1222 may have access to account information associated with the computing instances 1204a-d, such as the name of an owner of the account, credit card information, country of the owner, and the like. In another example, customer account information 1224 may include a unique identifier for a customer, a customer address, billing information, licensing information, customization parameters for launching instances, scheduling information, etc. As described above, the customer account information 1224 may also include security information used in encryption of asynchronous responses to API requests.

In another example, a customer can include a "user" or a "client." A client can include one or more processors or memory or instructions executed by one or more processors or memory. The client can be configured to access a service 555 provided by a server. The server can be located on a separate computer system and can be accessed by the client via a network 540.

In another example, an encryption key can include a series of bits configured for scrambling or unscrambling data. In one example, the encryption key can be one or more of a public encryption key or a private encryption key. The public encryption key can be configured to encrypt information and the private encryption key can be configured to decrypt information that is encrypted using the public key.

In another example, the controller 520 can be further configured to provide: access to a level of information of the carrier-specific information for the one or more of the n bands based on one or more of: a username and password authentication, or a permission level associated with the username and password authentication; or access to a level of control of selected functions of the repeater via the server of the cloud-computing environment 555 based on one or more of: the username and password authentication, or the permission level associated with the username and password authentication.

In another example, the wideband repeater system can further comprise an n-band in-line repeater 516a configured to be coupled between the server port of the n-band repeater 506 and the server antenna 502. The n-band in-line repeater 516a can be configured to be coupled to the one or more processors, signal processors, or memory 508 via a wired or wireless interface 515.

In another example, the wideband repeater system can further comprise one or more communication ports configured to transmit the carrier-specific information from the n-band repeater 506 to the server located in the cloud-computing environment 555. The one or more communication ports can be one or more of a wired communication port, a wireless communication port, an optical communication port, or a radio frequency communication port. The wired communication port can include, without limitation, an Ethernet communication port. The wireless communication port can be configured to communicate, without limitation, in one or more of: a wireless local area network (WLAN) (e.g., Wi-Fi), a wireless personal area network (WPAN) (e.g., Bluetooth), or a wireless wide area network (WWAN) (e.g., 3GPP LTE or 3GPP 5G).

In another example, the wideband repeater system can further comprise a local device (e.g., 512 or a UE) in communication with the one or more processors, signal processors, or memory 508 via a wired or wireless interface. The wired interface can include an Ethernet interface. The wireless interface can include one or more of a WLAN, a WPAN, or a WWAN.

In another example, the wideband repeater system can be configured to be coupled to a display (e.g., 510 or 512). The display can be configured to be coupled with the one or more processors, signal processors, or memory 508. The display can be configured to display carrier-specific information for the n-band repeater 506.

In another example, the display can be one or more of: an integrated display (e.g., a display that is integrated with the wideband repeater system, such as 510); a mobile display (e.g., a display on a UE, such as a mobile device or a local device with a display 512); or a remote display (e.g., a display that can be configured to communicate with the wideband repeater system via a WLAN or WWAN). In one example, the integrated display (e.g., 510) can be coupled to the n-band repeater 506.

Figure 5B:
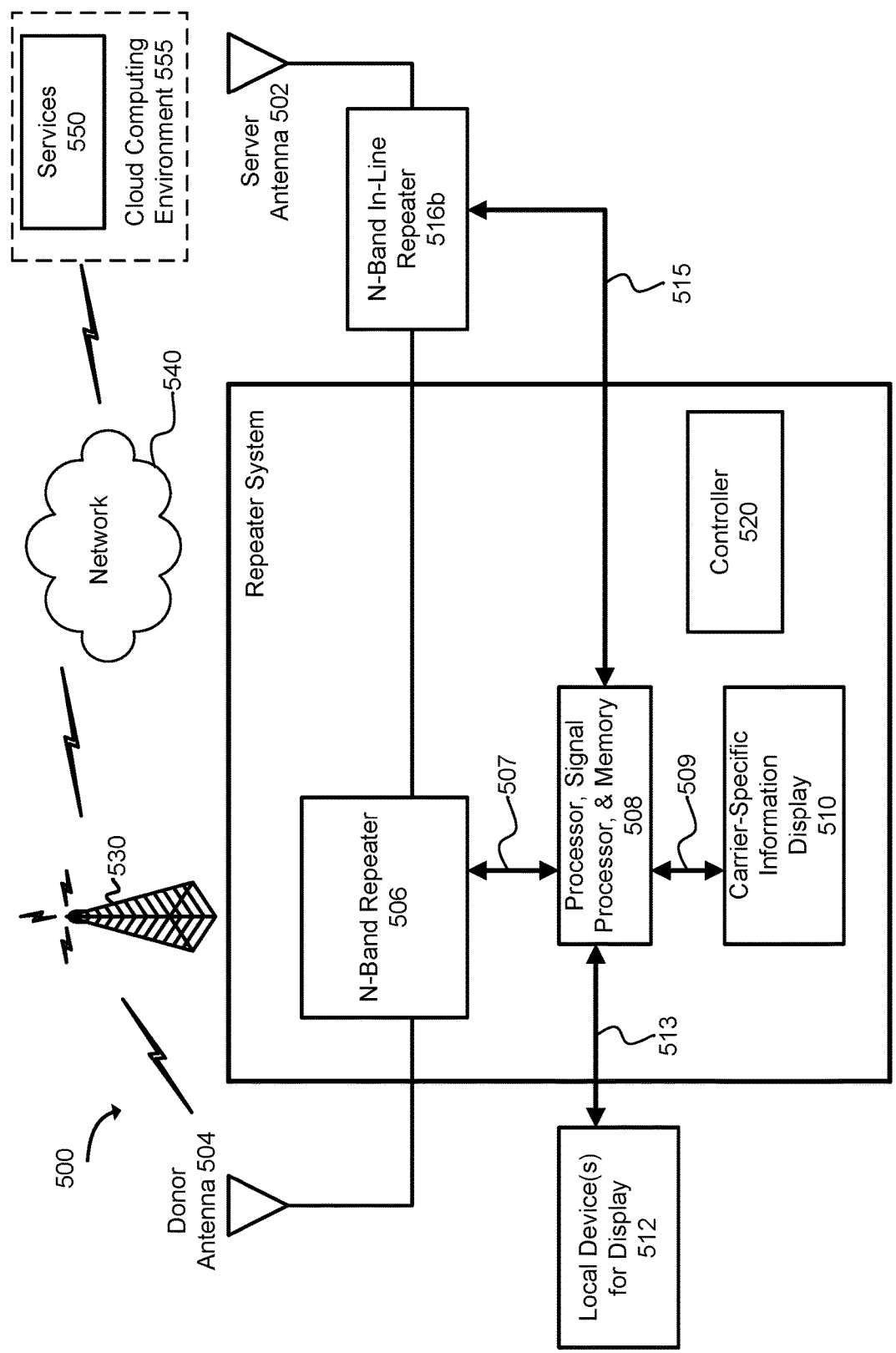
FIG. 5b illustrates a repeater system configured to provide services via a cloud-computing environment in accordance with an example.

In another example, as illustrated in FIG. 5b, a wideband repeater system can comprise an n-band in-line repeater 516b with a display that can be coupled to the in-line repeater 516b. In another example, the wideband repeater system can comprise a first display (e.g., 510) coupled to the n-band repeater 506 and a second display coupled to the n-band in-line repeater 516b.

In another example, the first display can be a touchscreen display configured to display the carrier-specific information for the n-band repeater 506 and configured to enable control of the n-band repeater 506. In another example, the second display can be configured to be in communication with one or more of: the one or more processors, signal processors, or memory 508; or the server of the cloud-computing environment 555. In another example, the second display can be a touchscreen display configured to display the carrier-specific information for the n-band repeater 506 and configured to enable control of the n-band repeater 506.

Figure 5C:
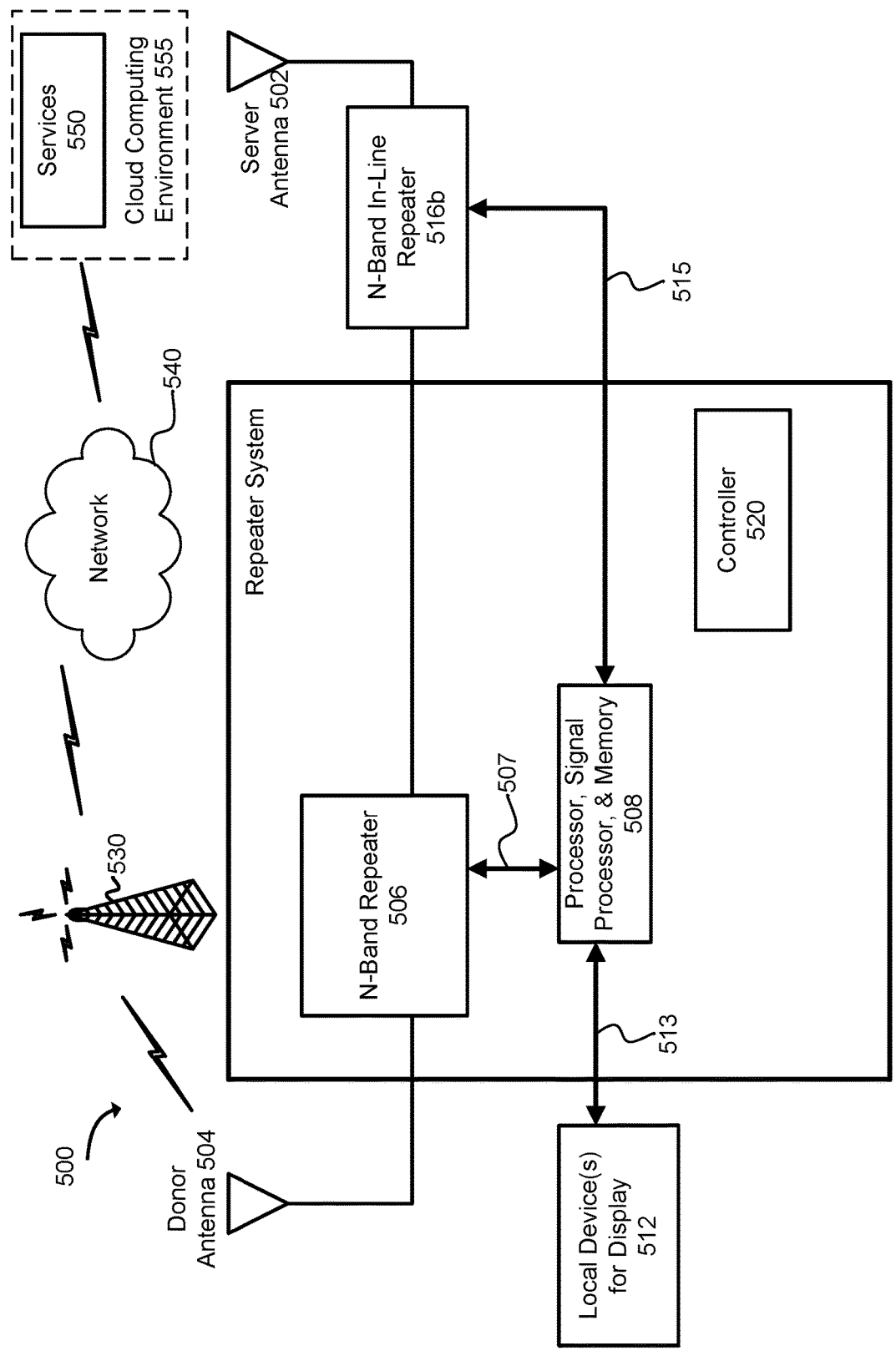
FIG. 5c illustrates a repeater system configured to provide services via a cloud-computing environment in accordance with an example.

In another example, as illustrated in FIG. 5c, a repeater system may not include an integrated display (e.g., a carrier-specific information display 510 that can be integrated with the n-band repeater). In this example, the local device 512 (or a mobile device or UE) can be configured to display the carrier-specific information. In this example, a remote display can be configured to display the carrier-specific information.

Figure 5D:
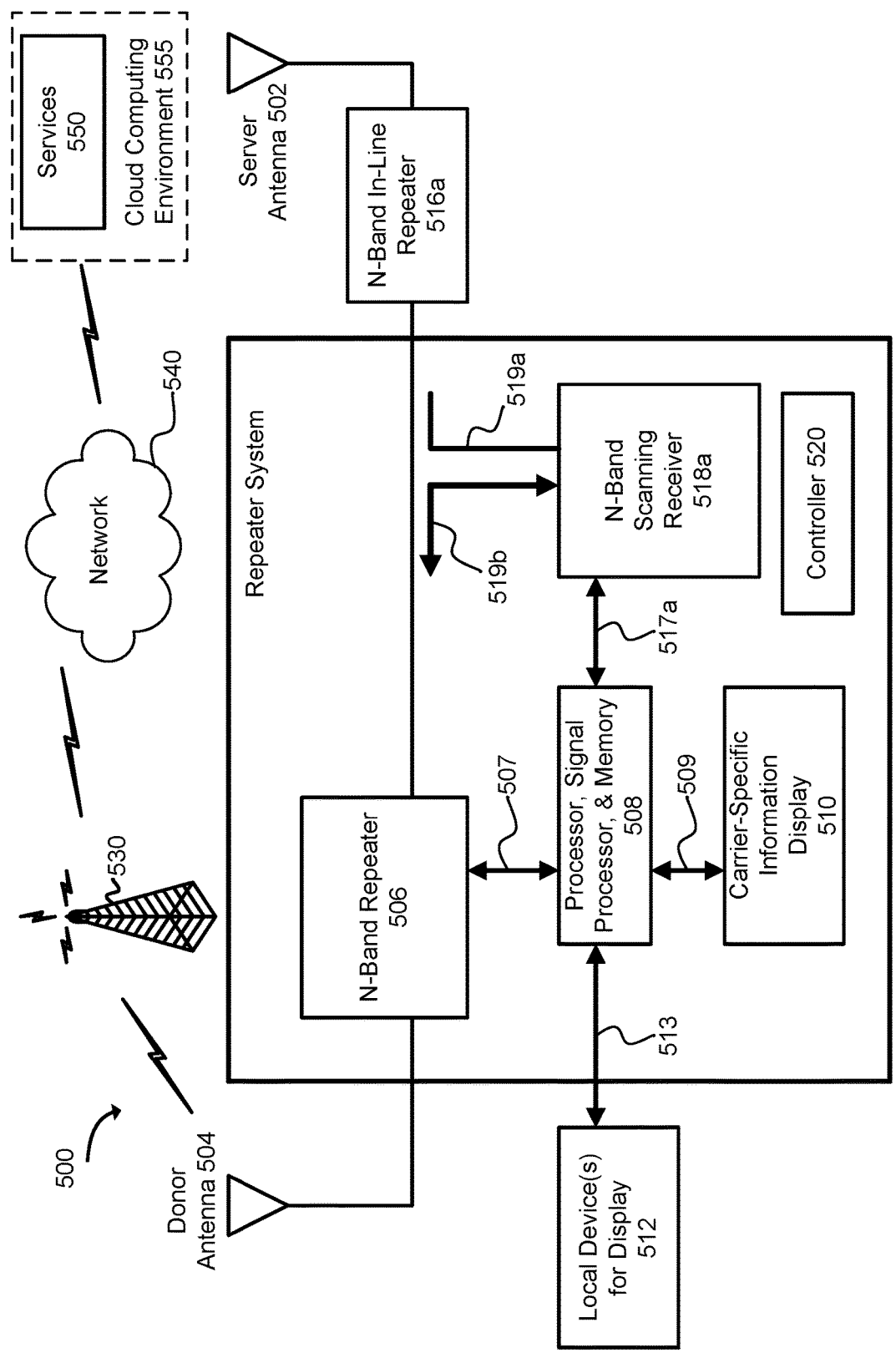
FIG. 5d illustrates a repeater system configured to provide services via a cloud-computing environment in accordance with an example.

In another example, as illustrated in FIG. 5d, a wideband repeater system can further comprise an n-band scanning receiver 518a. The n-band scanning receiver 518a can be configured to be coupled to the one or more processors, signal processors, or memory 508. The n-band scanning receiver 518a can be configured to scan one or more of the n bands of the n-band repeater 506 and communicate carrier-specific information for the one or more of the n bands to a server located in the cloud-computing environment 555 to enable access to the carrier-specific information from the cloud-computing environment 555.

In another example, the carrier-specific information can include carrier-specific information for a plurality of carriers in each band of the one or more of the n-bands. In one example, a band Y can include a first frequency range for a first carrier (e.g., Carrier A) and a second frequency range for a second carrier (e.g., Carrier B). In this example, the carrier-specific information can include: carrier-specific information for Carrier A and carrier-specific information for Carrier B when Carrier A and Carrier B operate in the same band Y.

In another example, the n-band scanning receiver 518a can be configured to determine the carrier-specific information from one or more of: a downlink signal received via the donor port from the donor antenna 504, an uplink signal received via the server port from the server antenna 502 via an interface 519a; or the one or more processors, signal processors, or memory 508 via the interface 517a. In another example, the n-band scanning receiver 518a can be configured to communicate with the n-band repeater 506 via the interface 519b.

In another example, the n-band scanning receiver 518a can comprise one or more transmitters. The one or more transmitters can be configured to transmit the carrier-specific information to a base station 530 for communication to the server located in the cloud-computing environment 555 via a network. In another example, the one or more transmitters can be configured to transmit the carrier-specific information to a signal transmitted via the donor port to the donor antenna 504 for communication to a base station 530 for communication to the server located in the cloud-computing environment 555.

In another example, the n-band scanning receiver 518a can be one or more of: a modem, a field-programmable gate array (FPGA), or an application-specific integrated circuit (ASIC).

In another example, the carrier-specific information for the one or more of the n-bands can include one or more of: a carrier name; one or more operating frequencies or operating frequency ranges; one or more channels for one or more operating bands; a direction of a cell tower from the n-band repeater 506; a location of the cell tower relative to the n-band repeater; a location of the cell tower; one or more of a time or date of a transmission or reception at the n-band repeater; a reference signal received power (RSRP); a reference signal received quality (RSRQ); a received signal strength indicator (RSSI); an arbitrary strength unit (ASU); a reference signal (RS) signal-to-noise ratio (RSSNR); an Evolved-Universal Mobile Telecommunication System (UMTS) Terrestrial Radio Access Network (E-UTRAN) cell identifier (ECI); or a tracking area code (TAC).

In another example, the carrier specific information can include one or more of: automatic gain control (AGC) information for control of the n-band repeater 506; antenna steering information for control of one or more antennas associated with the n-band repeater 506; or antenna positioning information for control of a position of one or more antennas (e.g., server antenna 502 or donor antenna 504) associated with the n-band repeater 506.

Figure 5E:
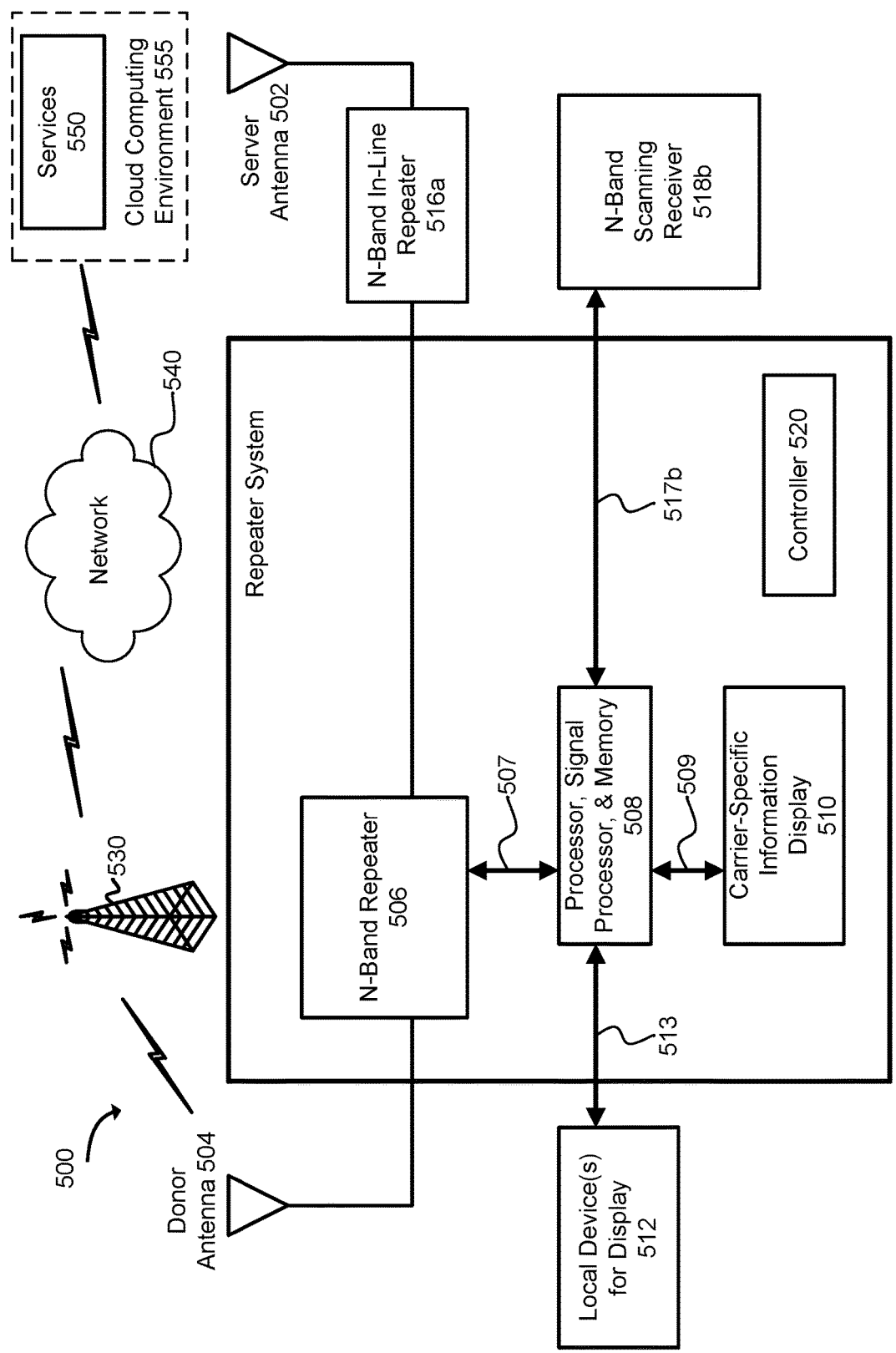
FIG. 5e illustrates a repeater system configured to provide services via a cloud-computing environment in accordance with an example.

In another example, as illustrated in FIG. 5e, an n-band scanning receiver 518b may not be integrated with the n-band repeater 506. In this example, the n-band scanning receiver 518b can be configured to communicate with the one or more processors, signal processors, or memory 508 via a wired, wireless, optical, or radio frequency interface 517b.

Figure 5F:
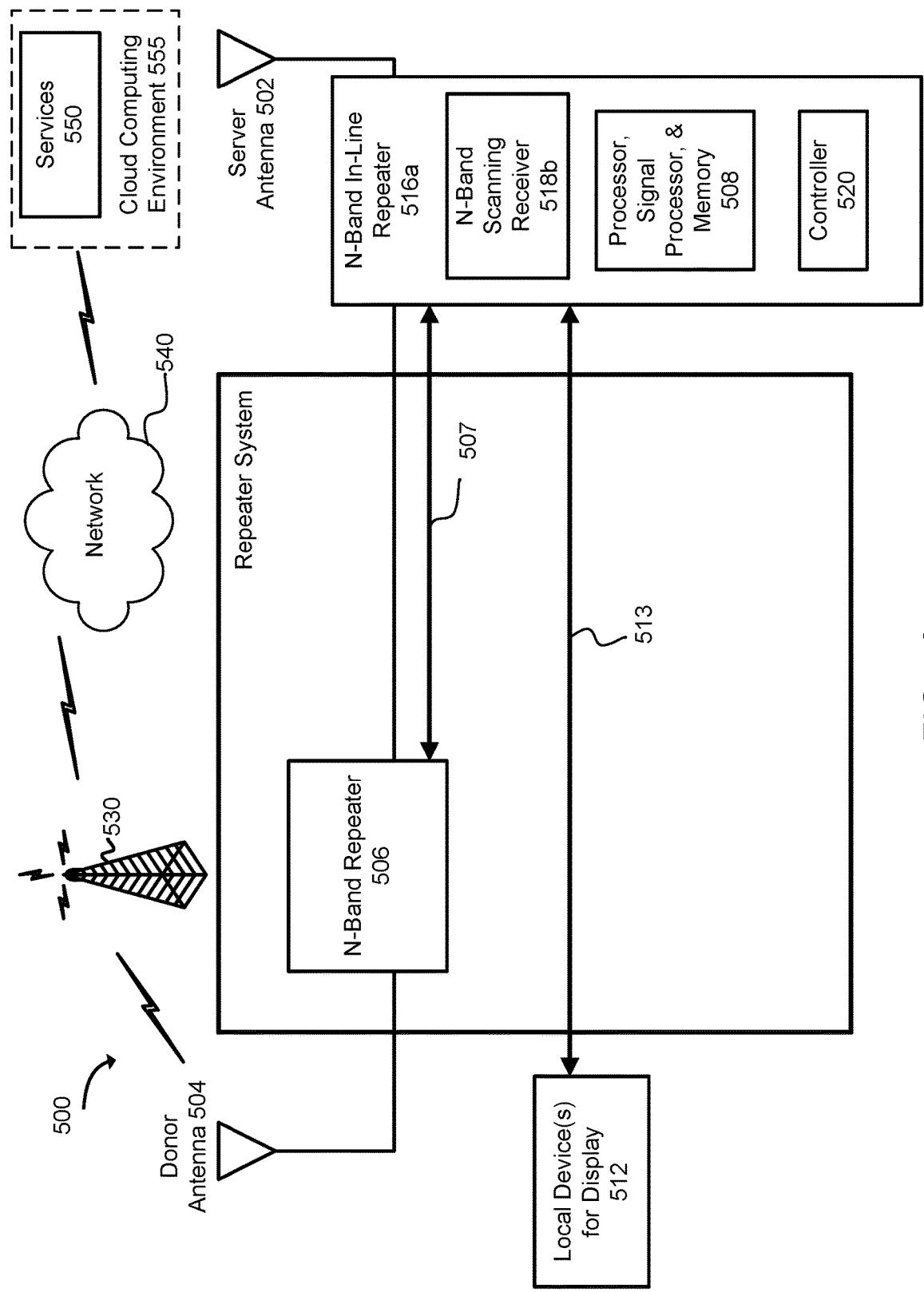
FIG. 5f illustrates a repeater system configured to provide services via a cloud-computing environment in accordance with an example.

In another example, as illustrated in FIG. 5f, one or more of: an n-band scanning receiver 518b; the one or more processors, signal processors, or memory 508; or the controller 508 can be configured to be housed within the n-band in-line repeater 516a. The n-band in-line repeater 516a can be configured to be connected to the n-band repeater 506 via the interface 507. The n-band in-line repeater 516a can be configured to be connected to a local device for display 512 via the interface 513.

Figure 6A:
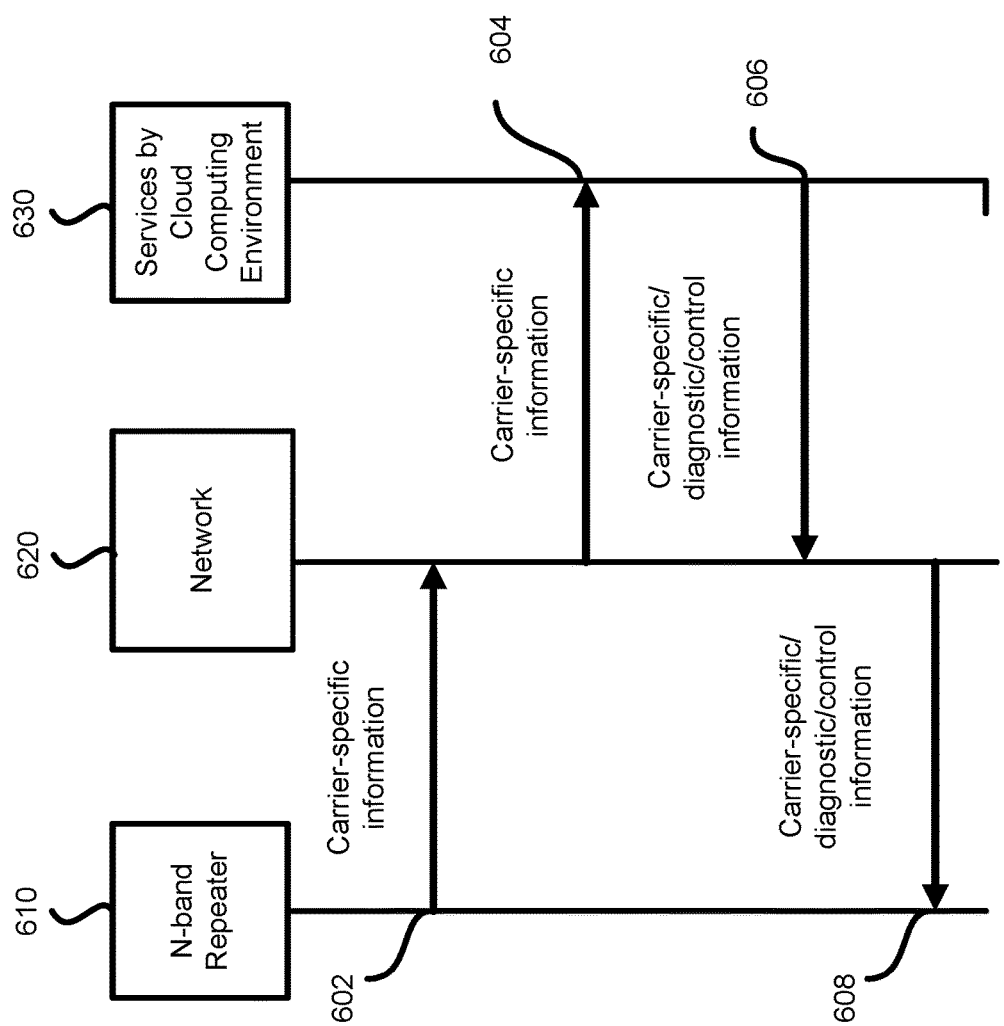
FIG. 6a depicts functionality of a repeater system configured to provide services via a cloud-computing environment in accordance with an example.

In another example, as depicted in FIG. 6a, a repeater system can be configured to communicate with a cloud-computing environment. In one example, an n-band repeater 610 can be configured to communicate carrier-specific information to a network 620, as depicted in operation 602. In one example, a network 620 can be configured to communicate the carrier-specific information to services 630, as depicted in operation 604. In one example, services 630 can be configured to communicate one or more of carrier-specific information, diagnostic information, or control information to the network 620, as depicted in operation 606. In one example, the network 620 can be configured to communicate one or more of carrier-specific information, diagnostic information, or control information to the n-band repeater 610 for display or control, as depicted in operation 608.

Figure 6B:
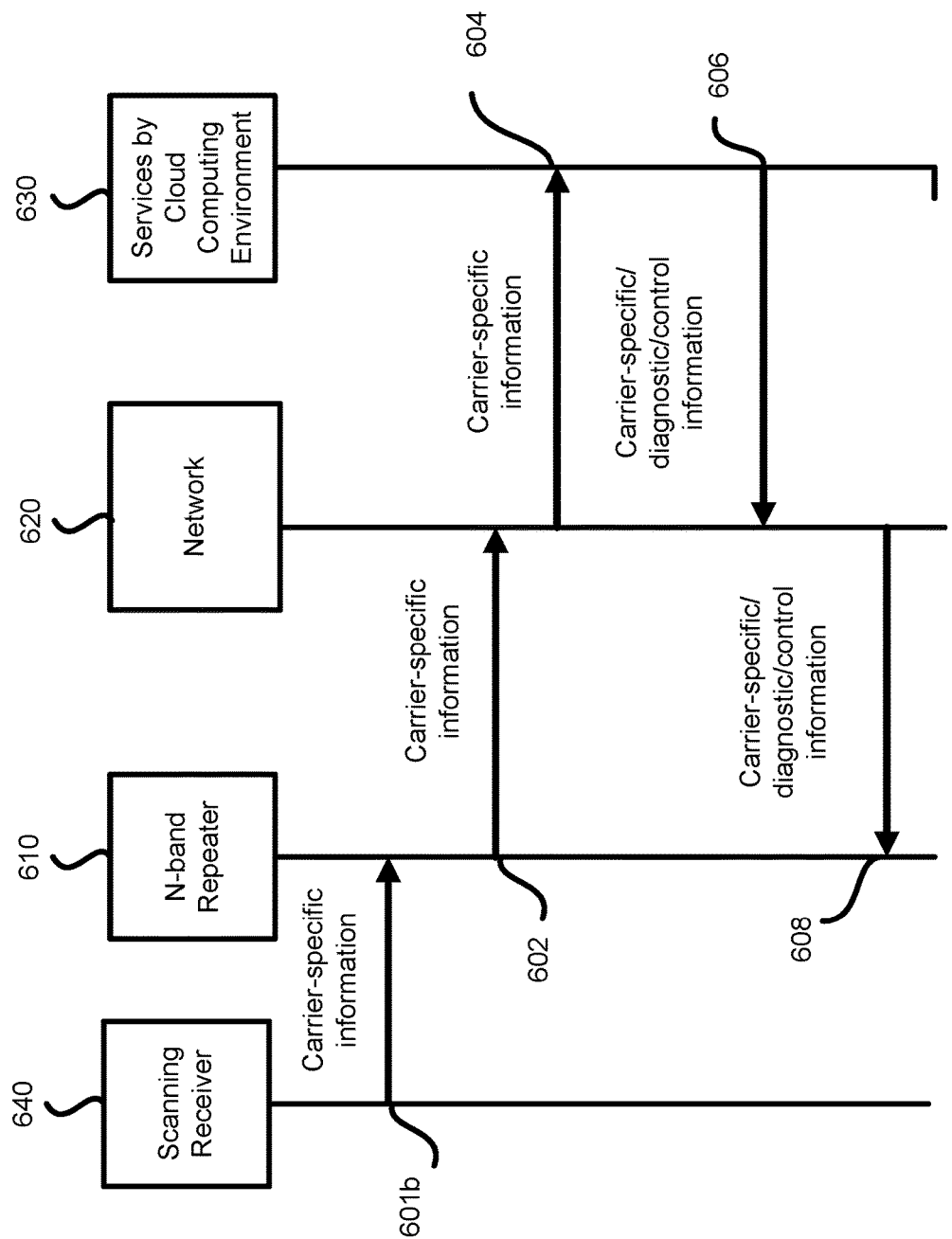
FIG. 6b depicts functionality of a repeater system configured to provide services via a cloud-computing environment in accordance with an example.

In another example, as depicted in FIG. 6b, a scanning receiver 640 can be configured to communicate the carrier-specific information to the n-band repeater 610, as depicted in operation 601b.

Figure 6C:
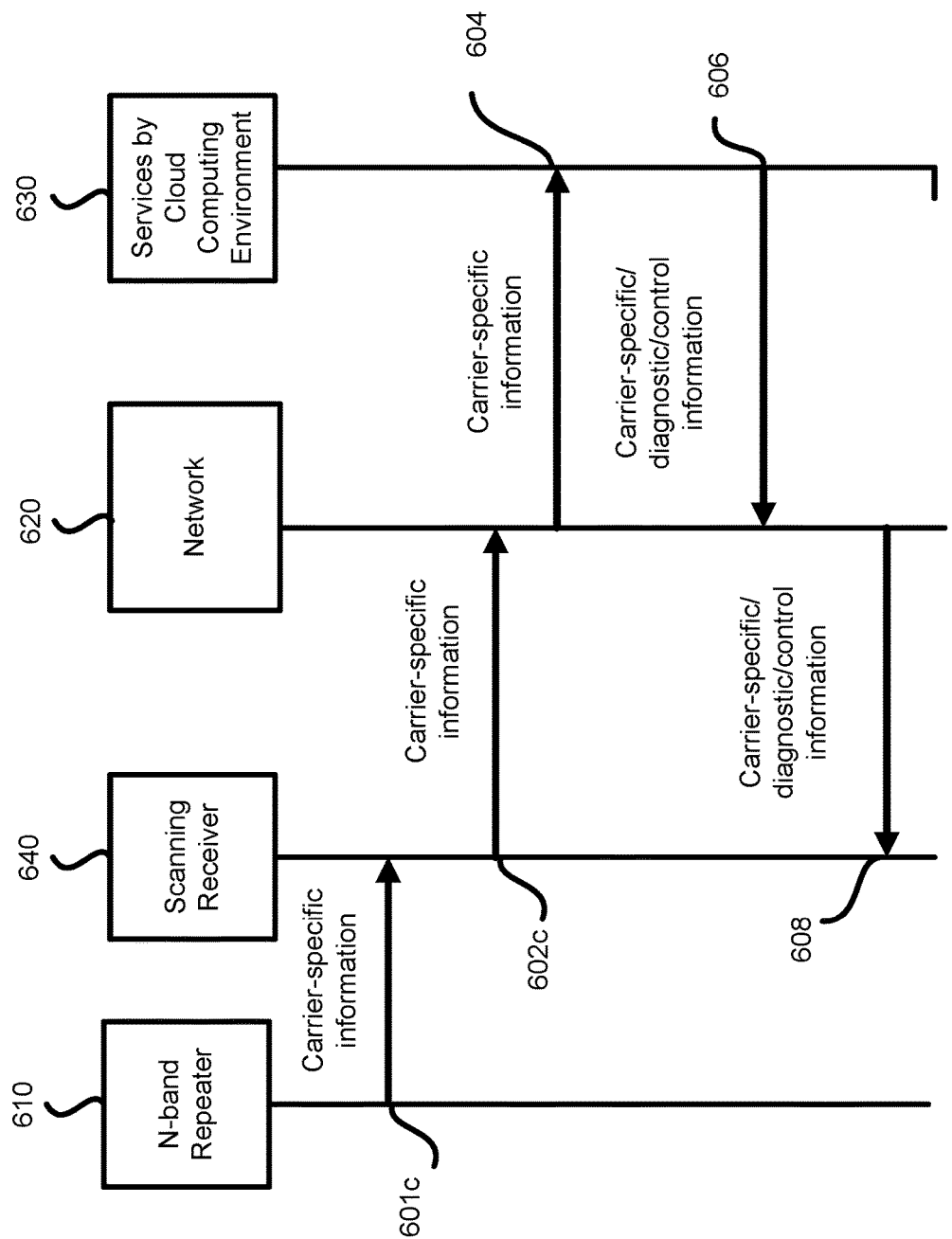
FIG. 6c depicts functionality of a repeater system configured to provide services via a cloud-computing environment in accordance with an example.

In another example, as depicted in FIG. 6c, an n-band repeater 610 can be configured to communicate the carrier specific information to a scanning receiver 640, as depicted in operation 601c. In another example, the scanning receiver 640 can be configured to communicate the carrier-specific information to the network 620, as depicted in operation 602c.

Figure 6D:
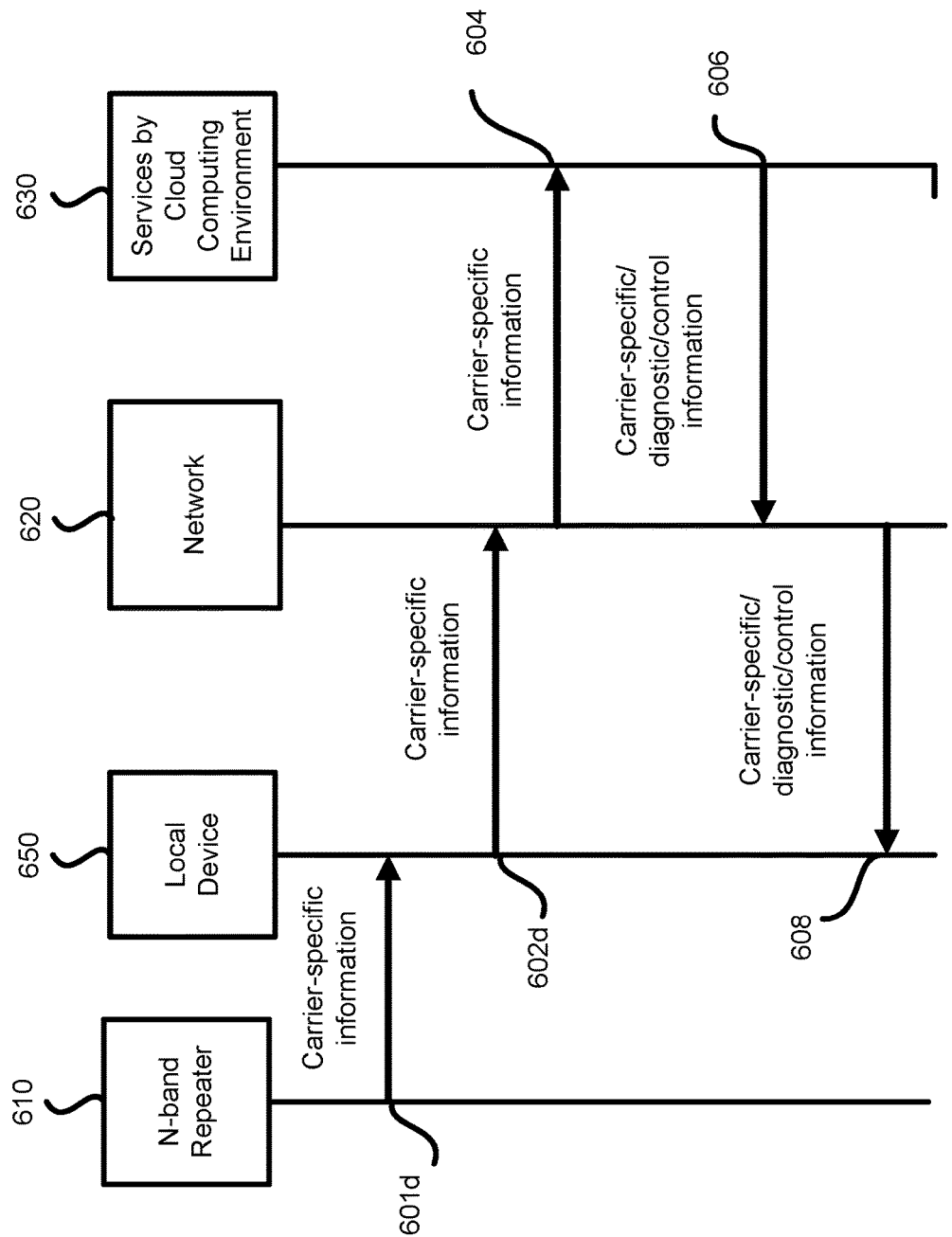
FIG. 6d depicts functionality of a repeater system configured to provide services via a cloud-computing environment in accordance with an example.

In another example, as depicted in FIG. 6d, an n-band repeater 610 can be configured to communicate the carrier specific information to a local device 650, as depicted in operation 601d. In another example, the local device 650 can be configured to communicate the carrier-specific information to the network 620, as depicted in operation 602d.

In another example, as depicted in FIG. 7a, services 750 can be configured to provide one or more of carrier-specific information, diagnostic information, or control information to an n-band repeater system 710 via a network 740, as depicted in operations 702 and 704. The one or more of carrier-specific information, diagnostic information, or control information can be modified based on a level of control. The level of control can be provided using an encryption key. In one example, the one or more of carrier-specific information, diagnostic information, or control information can be modified to display a range of information from no information, partial information, or full information based on the encryption key (i.e. a level of control granted to a user). In one example, the one or more of carrier-specific information, diagnostic information, or control information can be modified to control a range of controllable functions from no controllable functions, partial controllable functions, or full controllable functions based on the encryption key.

In another example, an encryption key can be configured to grant a user a specific access level to the repeater system. The access level can include: full access to the repeater system's software and hardware functions; limited access to the repeater system's software and hardware functions; or no access to the system's software and hardware functions.

Each user can be granted a desired level of access. Each encryption key can be configured to enable the user to have a desired level of access to control and/or monitor the repeater system.

Figure 7B:
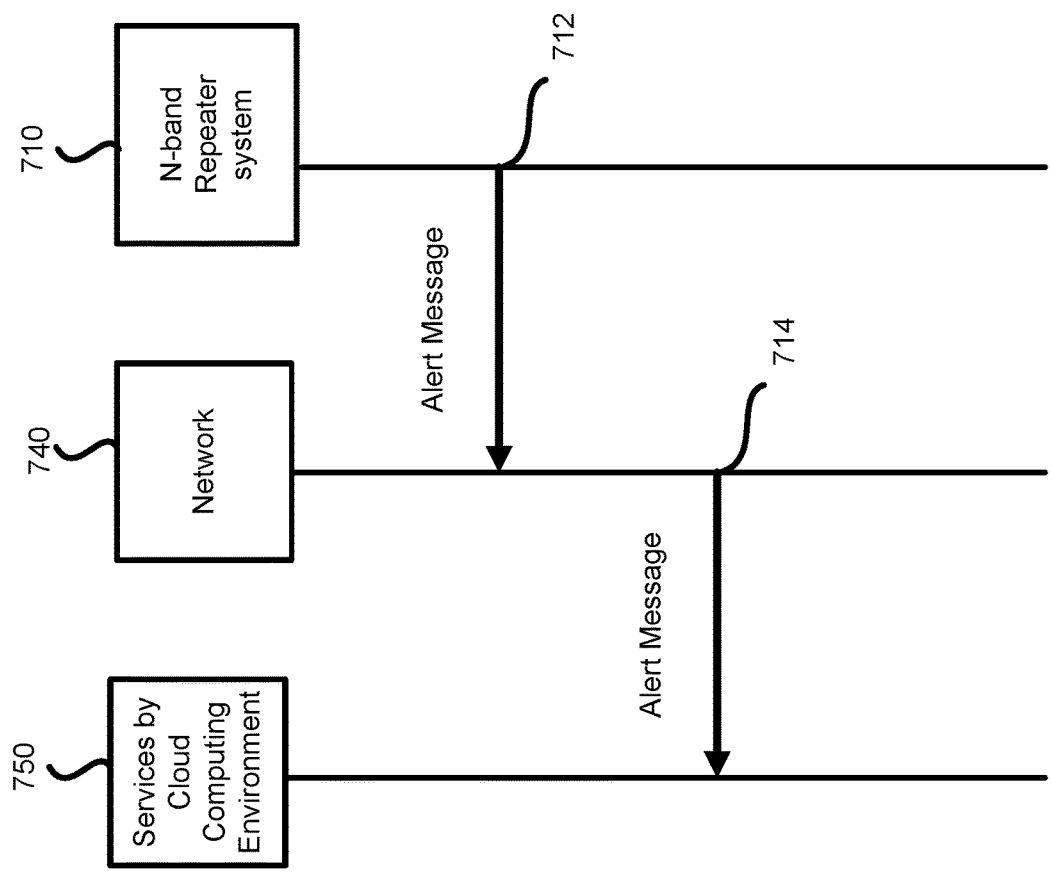
FIG. 7b illustrates a repeater system configured to provide services via a cloud-computing environment in accordance with an example.

In another example, as illustrated in FIG. 7b, an alert message (e.g., a message that includes information about tampering or unauthorized use by a user or non-user) can be communicated between the N-band repeater system 710 and services 750 via the network 740. An alert message 712 can be communicated between the N-band repeater system 710 and the network 740. An alert message 714 can be communicated between the network 740 and services 750.

In another example, the alert message can be configured to be communicated via one or more of a text or an email between the N-band repeater system 710 and a UE associated with services 750. In another example, the alert message can be configured to be communicated via remote console messaging to a UE associated with services 750.

In another example, the alert message can be configured to provide information in real time to services 750. The alert message can be configured based on service level agreement failure indicators. The alert message can be configured to provide information to services 750 to enable successful services operations. The alert message can also include information to inform services 750 of tampering of the n-band repeater system 710 by a user. The alert message can also inform services 750 of any other unauthorized use by a non-user.

Figure 8:
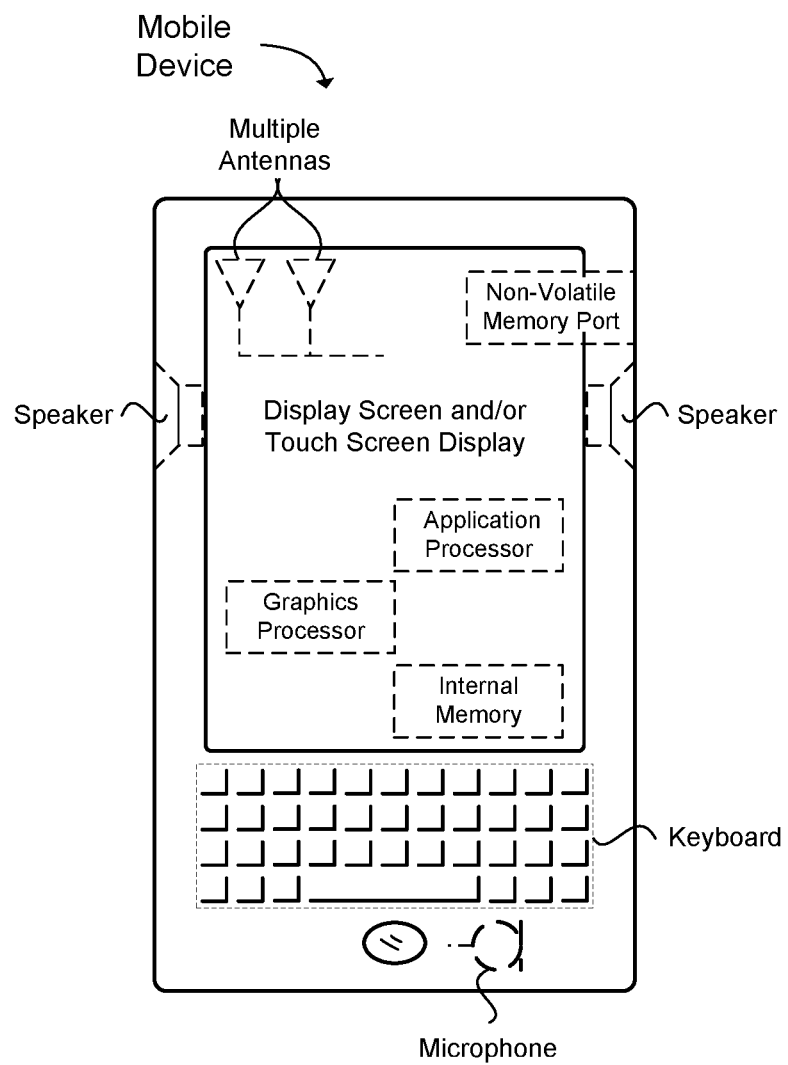
FIG. 8 illustrates a user equipment (UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a new radio node B (gNB) a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, 3GPP 5G, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 9:
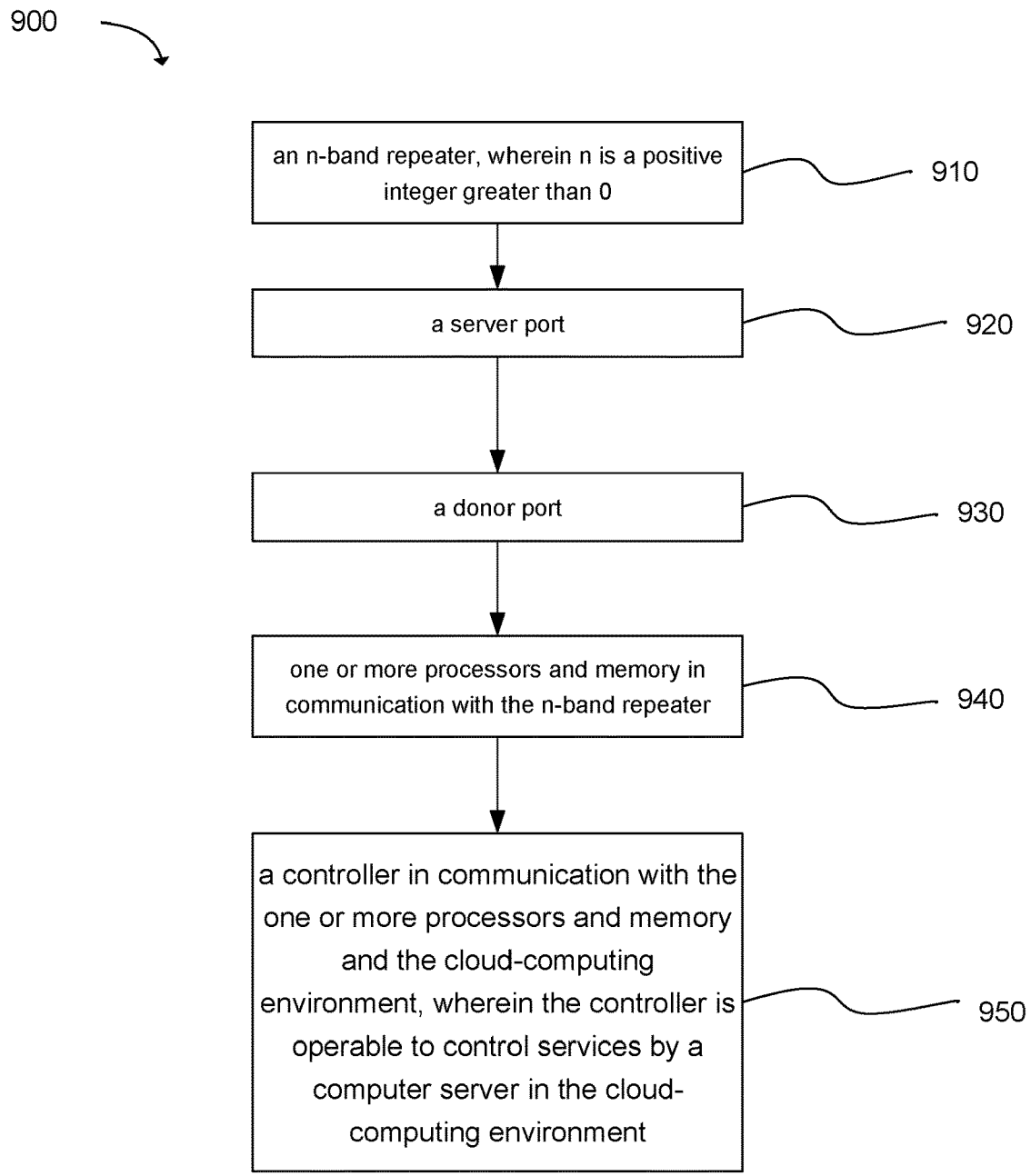
FIG. 9 depicts functionality of a repeater system configured to control services by a cloud-computing environment in accordance with an example.

Another example provides functionality for a repeater system 900, as shown in the flow chart in FIG. 9. The repeater system can comprise: an n-band repeater, wherein n is a positive integer greater than 0, as shown in block 910. The repeater system can comprise: a server port, as shown in block 920. The repeater system can comprise: a donor port, as shown in block 930. The repeater system can comprise one or more processors and memory in communication with the n-band repeater, as shown in block 940. The repeater system can comprise a controller in communication with the one or more processors and memory and the cloud-computing environment, wherein the controller is operable to control services by a computer server in the cloud-computing environment, as shown in block 950.

Figure 10:
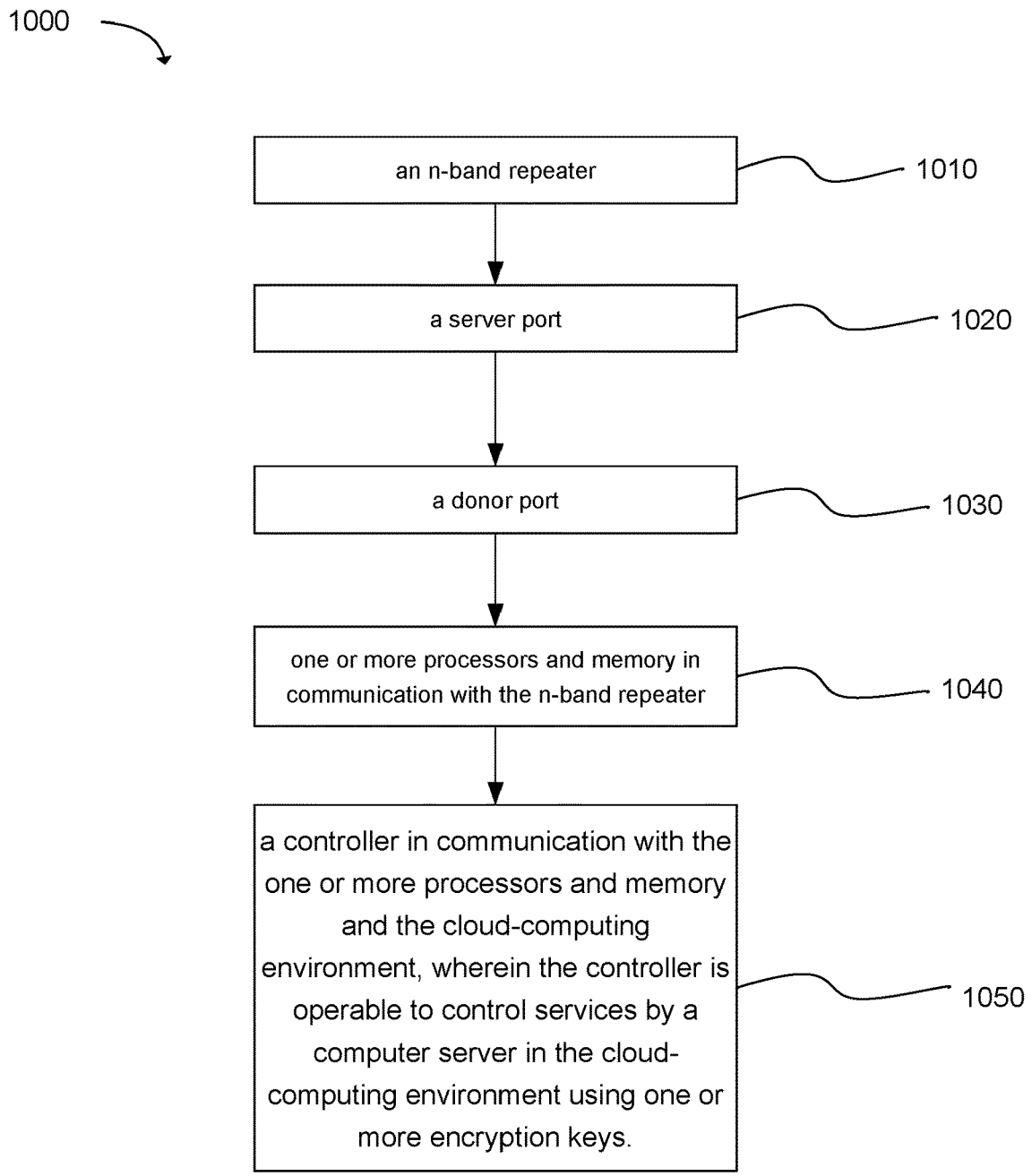
FIG. 10 depicts functionality of a repeater system configured to control services by a cloud-computing environment in accordance with an example.

Another example provides functionality for a repeater system 1000 configured to control services by a cloud-computing environment, as shown in the flow chart in FIG. 10. The repeater system can comprise: an n-band repeater, as shown in block 1010. The repeater system can comprise: a server port, as shown in block 1020. The repeater system can comprise a donor port, as shown in block 1030. The repeater system can comprise one or more processors and memory in communication with the n-band repeater, as shown in block 1040. The repeater system can comprise a controller in communication with the one or more processors and memory and the cloud-computing environment, wherein the controller is operable to control services by a computer server in the cloud-computing environment using one or more encryption keys, as shown in block 1050.

Figure 11:
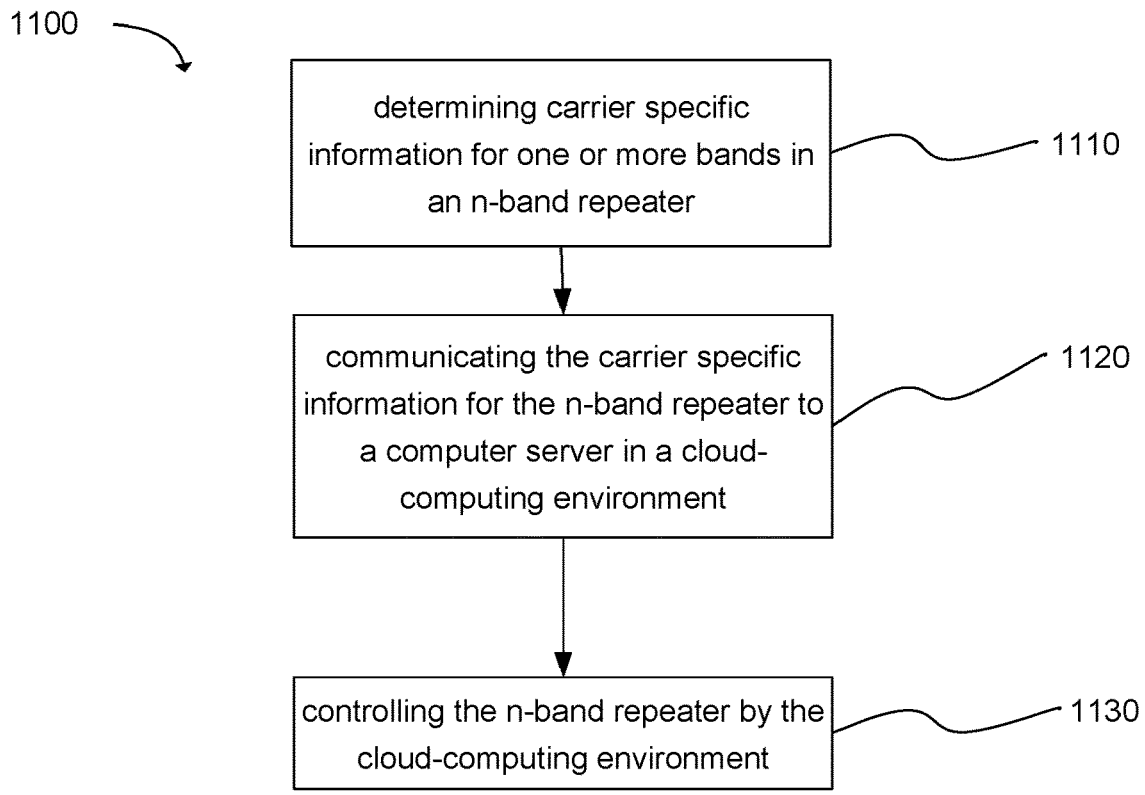
FIG. 11 depicts a method for controlling n-band repeater services by a cloud-computing environment in accordance with an example.

Another example provides a method 1100 for controlling n-band repeater services by a cloud-computing environment, as shown in the flow chart in FIG. 11. The method can comprise: determining carrier specific information for one or more bands in an n-band repeater, as shown in block 1110. The method can comprise communicating the carrier specific information for the n-band repeater to a computer server in a cloud-computing environment, as shown in block 1120. The method can comprise controlling the n-band repeater by the cloud-computing environment, as shown in block 1130.

Figure 12:
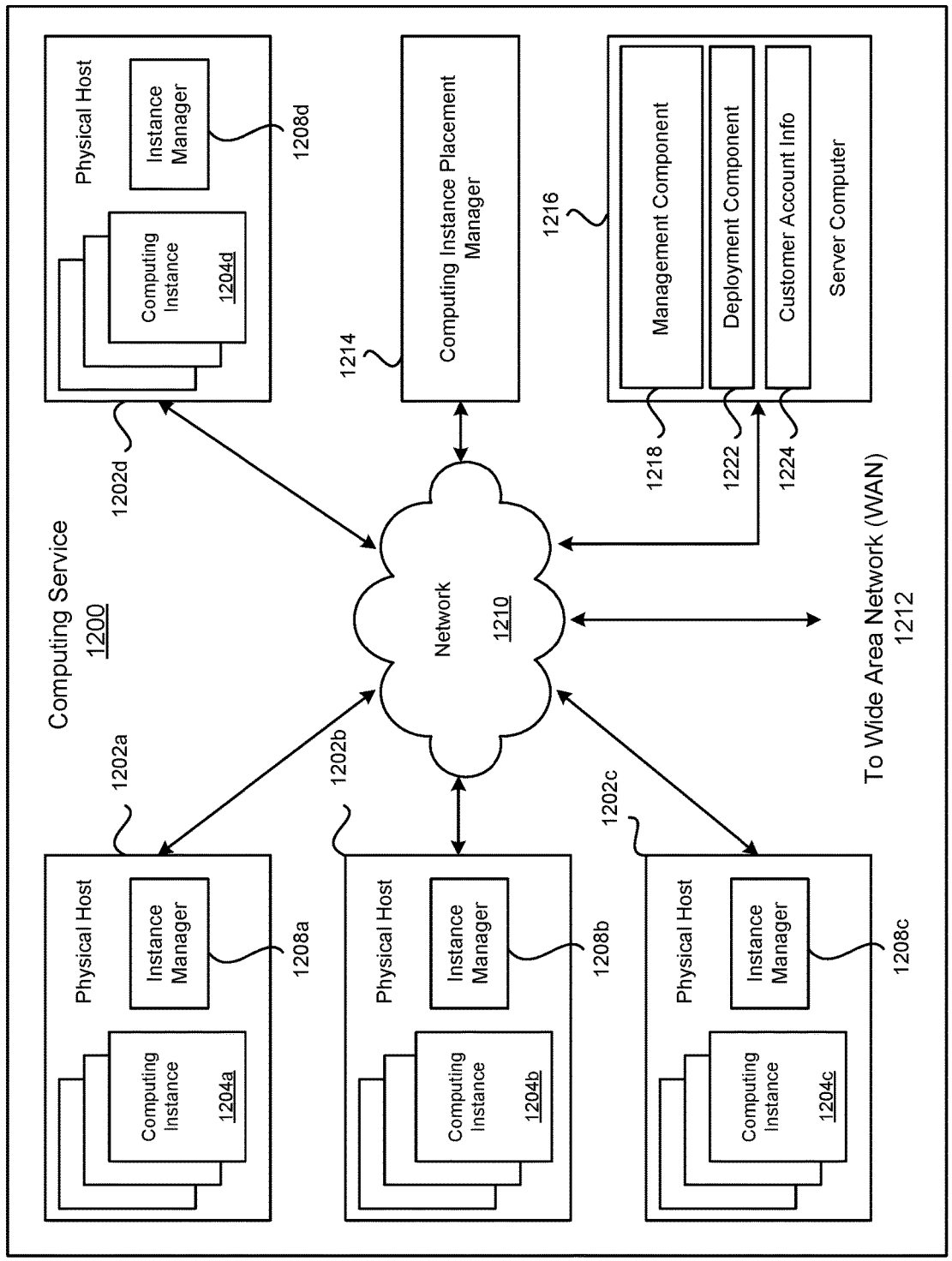
FIG. 12 illustrates a block diagram that illustrates an example computing service environment (CSE)

FIG. 12 is a block diagram illustrating an example computing service 1200 that may be used to execute and manage a number of computing instances 1204a-d. In particular, the computing service 1200 depicted illustrates one environment in which the technology described herein may be used. The computing service 1200 may be one type of environment that includes various virtualized service resources that may be used, for instance, to host computing instances 1204a-d.

The computing service 1200 may be capable of delivery of computing, storage and networking capacity as a software service to a community of end recipients. In one example, the computing service 1200 may be established for an organization by or on behalf of the organization. That is, the computing service 1200 may offer a "private cloud environment." In another example, the computing service 1200 may support a multi-tenant environment, wherein a plurality of customers may operate independently (i.e., a public cloud environment). Generally speaking, the computing service 1200 may provide the following models: Infrastructure as a Service ("IaaS"), Platform as a Service ("PaaS"), and/or Software as a Service ("SaaS"). Other models may be provided. For the IaaS model, the computing service 1200 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1200. End customers may access the computing service 1200 using networked client devices, such as desktop computers, laptops, tablets, smartphones, etc. running web browsers or other lightweight client applications, for example. Those familiar with the art will recognize that the computing service 1200 may be described as a "cloud" environment or a "cloud-computing" environment.

In some embodiments, a cloud-computing environment can also include remote control, wherein "remote control" is control of an apparatus from a distance by signals transmitted from a remote device. In some examples, the signals can be radio frequency (RF) signals. In other examples, the signals can be infrared (IR) signals. The distance can vary based on the capabilities of the remote device. In some examples, the remote device can transmit control information over a localized distance (e.g., about 50 meters or less). In other examples, the remote device can transmit control information over a wide distance (e.g., about 5 kilometers (km), 25 km, 50 km). In other examples, the remote device can transmit information over a global distance through network intermediaries.

The particularly illustrated computing service 1200 may include a plurality of server computers 1202*a-d*. While four server computers are shown, any number may be used, and large data centers may include thousands of server computers. The computing service 1200 may provide computing resources for executing computing instances 1204*a-d*. Computing instances 1204*a-d* may, for example, be virtual machines. A virtual machine may be an instance of a software implementation of a machine (i.e. a computer) that executes applications like a physical machine. In the example of a virtual machine, each of the server computers 1202*a-d* may be configured to execute an instance manager 1208*a-d* capable of executing the instances. The instance manager 1208*a-d* may be a hypervisor, virtual machine monitor (VMM), or another type of program configured to enable the execution of multiple computing instances 1204*a-d* on a single server. Additionally, each of the computing instances 1204*a-d* may be configured to execute one or more applications.

One or more server computers 1214 and 1216 may be reserved to execute software components for managing the operation of the computing service 1200 and the computing instances 1204*a-d*. For example, a server computer 1214 may execute a computing instance placement manager that may perform functions, such as querying the server computers 1202*a-d* for available computing slots and computing group state information, as well as determining a placement of a computing instance 1204*a-d* in an available computing slot.

A server computer 1216 may execute a management component 1218. A customer may access the management component 1218 to configure various aspects of the operation of the computing instances 1204*a-d* purchased by a customer. For example, the customer may setup computing instances 1204*a-d* and make changes to the configuration of the computing instances 1204*a-d*.

A deployment component 1222 may be used to assist customers in the deployment of computing instances 1204*a-d*. The deployment component 1222 may have access to account information associated with the computing instances 1204*a-d*, such as the name of an owner of the account, credit card information, country of the owner, etc. The deployment component 1222 may receive a configuration from a customer that includes data describing how computing instances 1204*a-d* may be configured. For example, the configuration may include an operating system, provide one or more applications to be installed in computing instances 1204*a-d*, provide scripts and/or other types of code to be executed for configuring computing instances 1204*a-d*, provide cache logic specifying how an application cache should be prepared, and other types of information. The deployment component 1222 may utilize the customer-provided configuration and cache logic to configure, prime, and launch computing instances 1204*a-d*. The configuration, cache logic, and other information may be specified by a customer accessing the management component 1218 or by providing this information directly to the deployment component 1222.

Customer account information 1224 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1224 may also include security information used in encryption of asynchronous responses to API requests. By "asynchronous" it is meant that the API response may be made at any time after the initial request and with a different network connection.

A network 1210 may be utilized to interconnect the computing service 1200 and the server computers 1202*a-d*, 1216. The network 1210 may be a local area network (LAN) and may be connected to a Wide Area Network (WAN) 1212 or the Internet, so that end customers may access the computing service 1200. The network topology illustrated in FIG. 12 has been simplified, many more networks and networking devices may be utilized to interconnect the various computing systems disclosed herein.

Figure 13A:
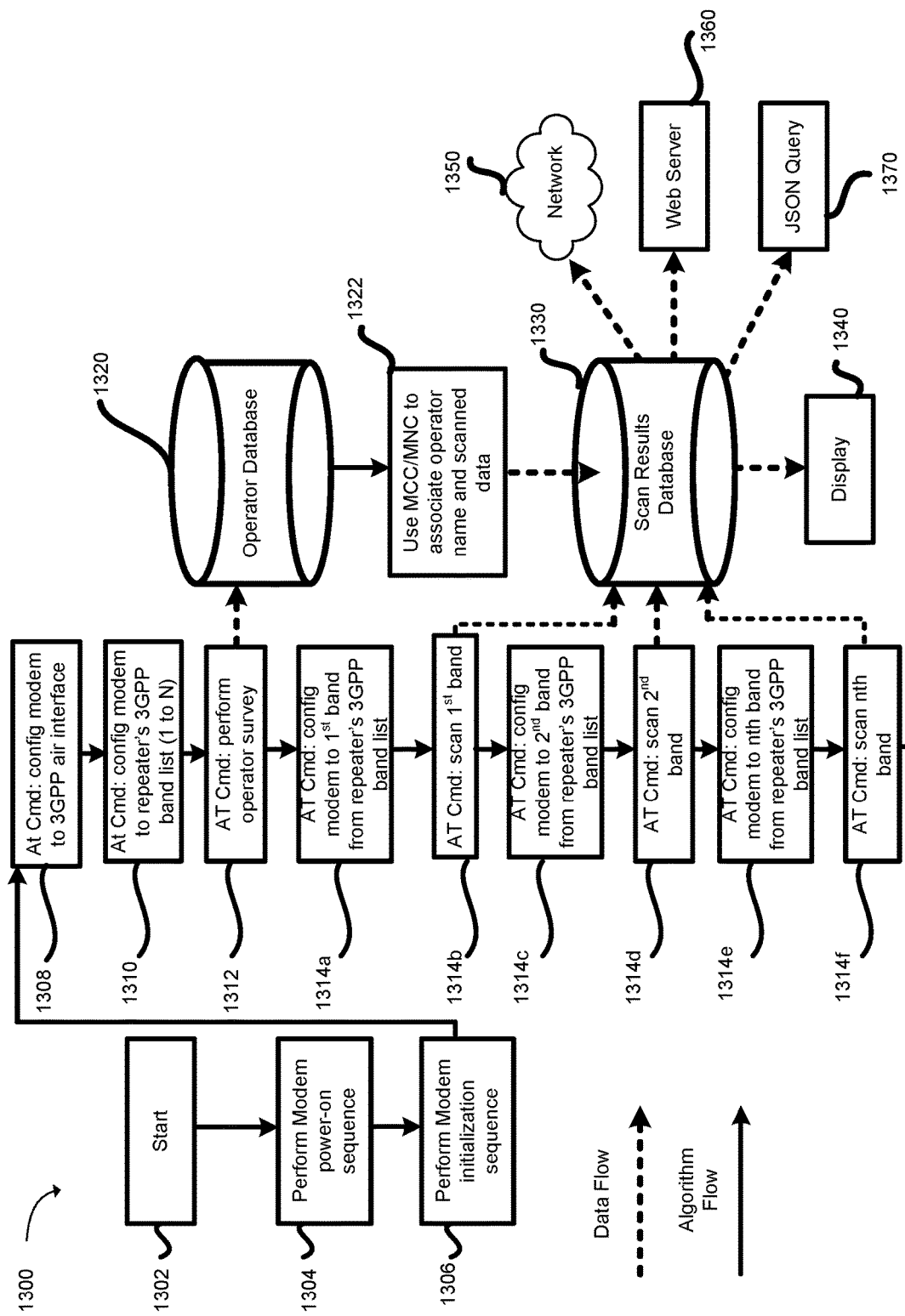
FIG. 13a depicts functionality of a scanning receiver in accordance with an example.
Figure 13B:
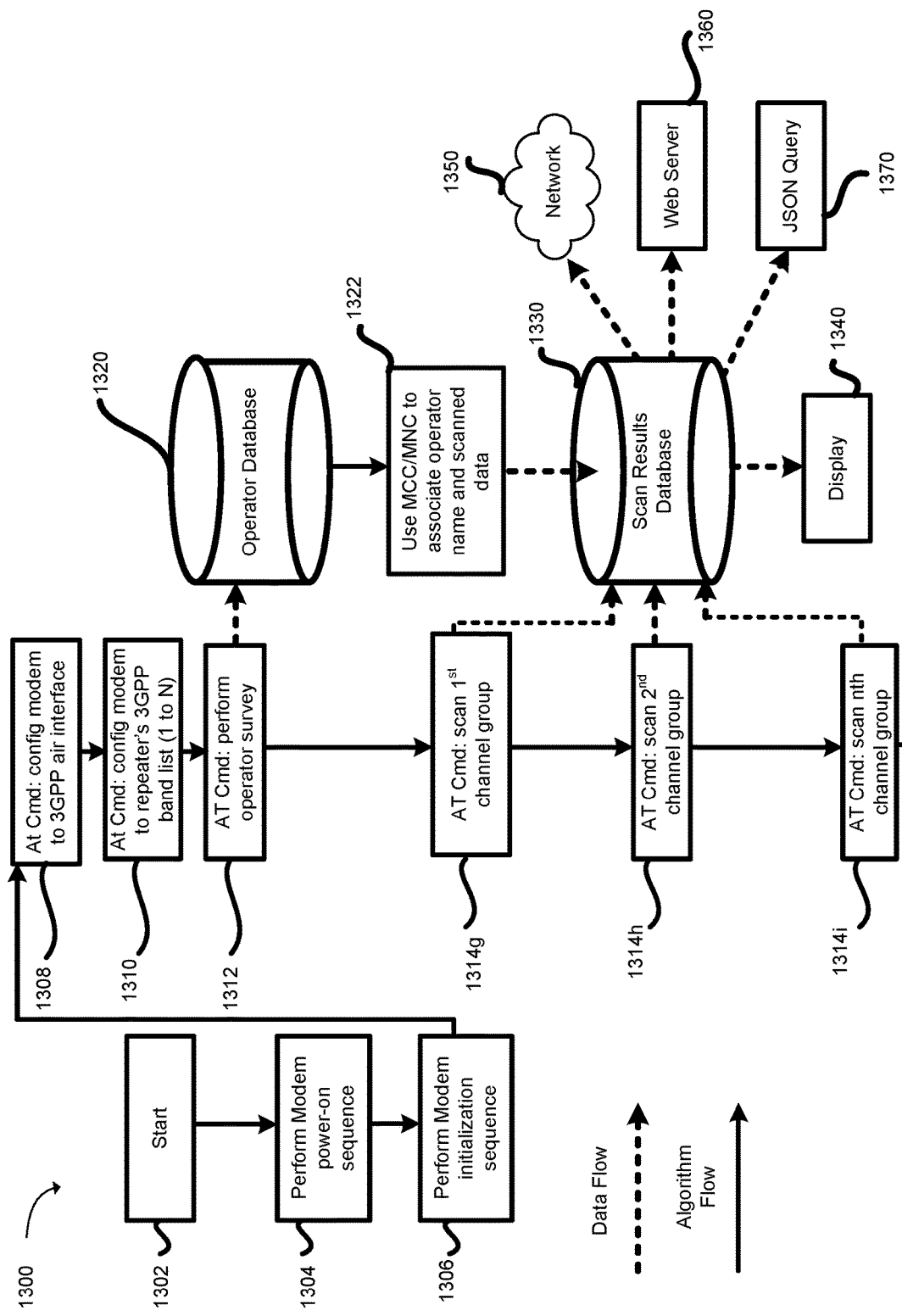
FIG. 13b depicts functionality of a scanning receiver in accordance with an example.

In another example, as illustrated in FIGS. 13*a*-13*c*, a scanning receiver can be configured to identify one or more frequency ranges associated with a plurality of cellular carriers. In one example, a scanning receiver can be configured to start, as depicted in operation 1302. In one example, a scanning receiver can be configured to perform a modem power-on sequence, as depicted in operation 1304. In one example, a scanning receiver can be configured to perform a modem initialization sequence, as depicted in operation 1306. In one example, the one or more frequency ranges can be received on a downlink (DL) from a base station.

In another example, the scanning receiver can be configured to use an "AT Cmd" to configure a modem to a Third Generation Partnership Project (3GPP) air interface (e.g., long-term evolution (LTE) fourth generation (4G) or fifth generation (5G)), as depicted in operation 1308. In another example, the scanning receiver can be configured to use an "AT Cmd" to configure the modem to a repeater's 3GPP band list (e.g., bands 1 through N, wherein N is a positive integer greater than 1), as depicted in operation 1310. In another example, the scanning receiver can be configured to perform an operator (e.g., cellular carrier) survey, as depicted in operation 1312.

In another example, operation 1308 can reduce the set of bands to about 56 total bands (e.g., the number of bands in 4G). In another example, operation 1310 can further reduce the set of bands to a subset of the 56 bands (e.g., six 4G bands for a repeater that is configured to be operable on six 4G bands). In another example, operation 1310 can further reduce the set of bands to a subset of the six 4G bands based on the operator survey. For example, 2 of the six 4G bands can be configured for Cellular Carrier AB, 3 of the six 4G bands can be configured for Cellular Carrier CD, and 1 of the six 4G bands can be configured for Cellular Carrier XY In this example, operation 1310 can reduce the six 4G bands to the 3 of the six 4G bands configured for Cellular Carrier CD.

In another example, the operator survey (operation 1312) can include the transmission of data from the scanning receiver to an operator database 1320. The operator database can be based on one or more of a database of the scanning receiver (e.g., a modem) or supplemental information including cellular carriers not include in the modem. The operator database can be configured to use the mobile country code (MCC) and mobile network code (MNC) to associate the operator or cellular carrier name with the scanned data from the scanning receiver, as depicted in operation 1322. The resultant association between the cellular carrier names from the operator database and scanned data from the scanning receiver can be stored in a scan result database 1330. After an adequate period of time operating in a particular location, the operator database can include the operators in the location with updates to channels on a periodic basis.

In another example, information in the scan results database can be communicated to one or more of: a display 1340, a network 1350, a cloud computing environment (e.g., a message queuing telemetry transport (MQTT) cloud via an MQTT heartbeat message), an embedded web server 1360, or a local direct memory access (DMAC) controller (e.g., via a javascript object notation (JSON) query 1370 on demand).

In another example, the scanning receiver can be configured to scan the one or more frequency ranges. In one example, the one or more frequency ranges can be a 3GPP band list determined from one or more of operations 1308 and 1310. For example, when operations 1308 and 1310 have identified 3 frequency bands associated with Cellular Carrier CD (e.g., Band D, Band E, and Band F), then the scanning receiver can be configured to scan each of the 3 identified frequency bands associated with Cellular Carrier CD (e.g., Band D, Band E, and Band F).

In another example, the scanning receiver can be configured to scan the one or more frequency ranges sequentially. As illustrated in FIG. 13*a*, the scanning receiver can be configured to use an "AT Cmd" to configure the modem to a $1^{st}$ band from the repeater's 3GPP band list, as depicted in operation 1314*a*. In one example, the scanning receiver can be configured to use an "AT Cmd" to scan the $1^{st}$ band, as depicted in operation 1314*b*. The scanning receiver can be further configured to use an "AT Cmd" to configure the modem to the $2^{nd}$ band list from the repeater's 3GPP band list, as depicted in operation 1314*c*. In one example, the scanning receiver can be configured to use an "AT Cmd" to scan the $2^{nd}$ band, as depicted in operation 1314*d*. The scanning receiver can be further configured to use an "AT Cmd" to configure the modem to the $N^{th}$ band list from the repeater's 3GPP band list, as depicted in operation 1314*e*. In one example, the scanning receiver can be configured to use an "AT Cmd" to scan the $N^{th}$ band, as depicted in operation 1314*f*.

In another example, the scanning receiver can be configured to scan the one or more frequency ranges based on channel groups. As illustrated in FIG. 13*b*, the scanning receiver can be configured to use an "AT Cmd" to scan a $1^{st}$ channel group from the repeater's 3GPP channel list, as depicted in operation 1314*g*. In another example, the scanning receiver can be configured to use an "AT Cmd" to scan a $2^{nd}$ channel group from the repeater's 3GPP channel list, as depicted in operation 1314*h*. In another example, the scanning receiver can be configured to use an "AT Cmd" to scan a $3^{rd}$ channel group from the repeater's 3GPP channel list, as depicted in operation 1314*i*.

In another example, the scanning receiver can be configured to scan the one or more frequency ranges with a single "AT Cmd." As illustrated in FIG. 13*c*, the scanning receiver can be configured to use an "AT Cmd" to scan the repeater's 3GPP band list labeled 1 through N, as depicted in operation 1314*j*.

In another example, the scanning receiver can be configured to identify cellular carrier specific information for the one or more frequency ranges associated with the plurality of cellular carriers and provide the cellular carrier specific information to the repeater. In one example, the cellular carrier specific information can include one or more of: a carrier name; one or more operating frequencies; one or more channels; a direction of a cell tower from the n-band repeater; a location of a cell tower; a time and date of a transmission; a reference signal received power (RSRP); a reference signal received quality (RSRQ); a received signal strength indicator (RSSI); an arbitrary strength unit (ASU); a reference signal (RS) signal to noise ratio (SNR) (RSSNR); an Evolved-UMTS Terrestrial Radio Access Network (E-UTRAN) cell identifier (ECI); a physical cell identifier (PCI); a tracking area code (TAC); automatic gain control (AGC) information for control of the n-band repeater; antenna steering information for control of one or more antennas associated with the n-band repeater; or antenna positioning information for control of a position of one or more antennas associated with the n-band repeater.

In another example, the scanning receiver can be configured to scan the one or more frequency ranges of the plurality of cellular carriers without a subscriber identity module (SIM) card, as depicted in the operations in FIGS. 13*a* to 13*c*. The scanning receiver may not register, connect, or attached to a particular network, which allows operation without a SIM. Operating a scanning receiver without a SIM card can enable the scanning receiver to receive carrier-specific information from multiple cellular carriers without having a contract with multiple cellular carriers or paying fees to each of the cellular carriers. Further, operating a scanning receiver without a SIM card can prevent security issues arising from unauthorized SIM card intrusions. Further, the hardware complexity of the scanning receiver can be reduced with a reduction in the number of components.

In another example, the cellular carrier specific information can be scanned and periodically updated for display based on a selected time period. In one example, the selected time period can be less than one or more of: 24 hours, 12 hours, 1 hour, 5 minutes, 5 seconds, 1 second, 100 milliseconds (ms), or 1 ms. In another example, the cellular carrier specific information can include historical data.

In another example, the scanning receiver can be configured to interface with a remote control. As previously discussed, remote control can include control of an apparatus from a distance by signals transmitted from a remote device. In one example, the signals can be IR signals. In another example, the signals can be RF signals. In other examples, the remote device can transmit information through network intermediaries.

In another example, the scanning receiver can be a long term evolution (LTE) layer-1 modem that can be configured to scan the one or more frequency bands without using LTE layer-2 or LTE layer-3. The modem can further support LTE layer-2 and LTE layer-3 functionality. The modem can scan the one or more frequency bands without receiving handshake information or communication back to the source of the transmission (e.g., base station).

Figure 14A:
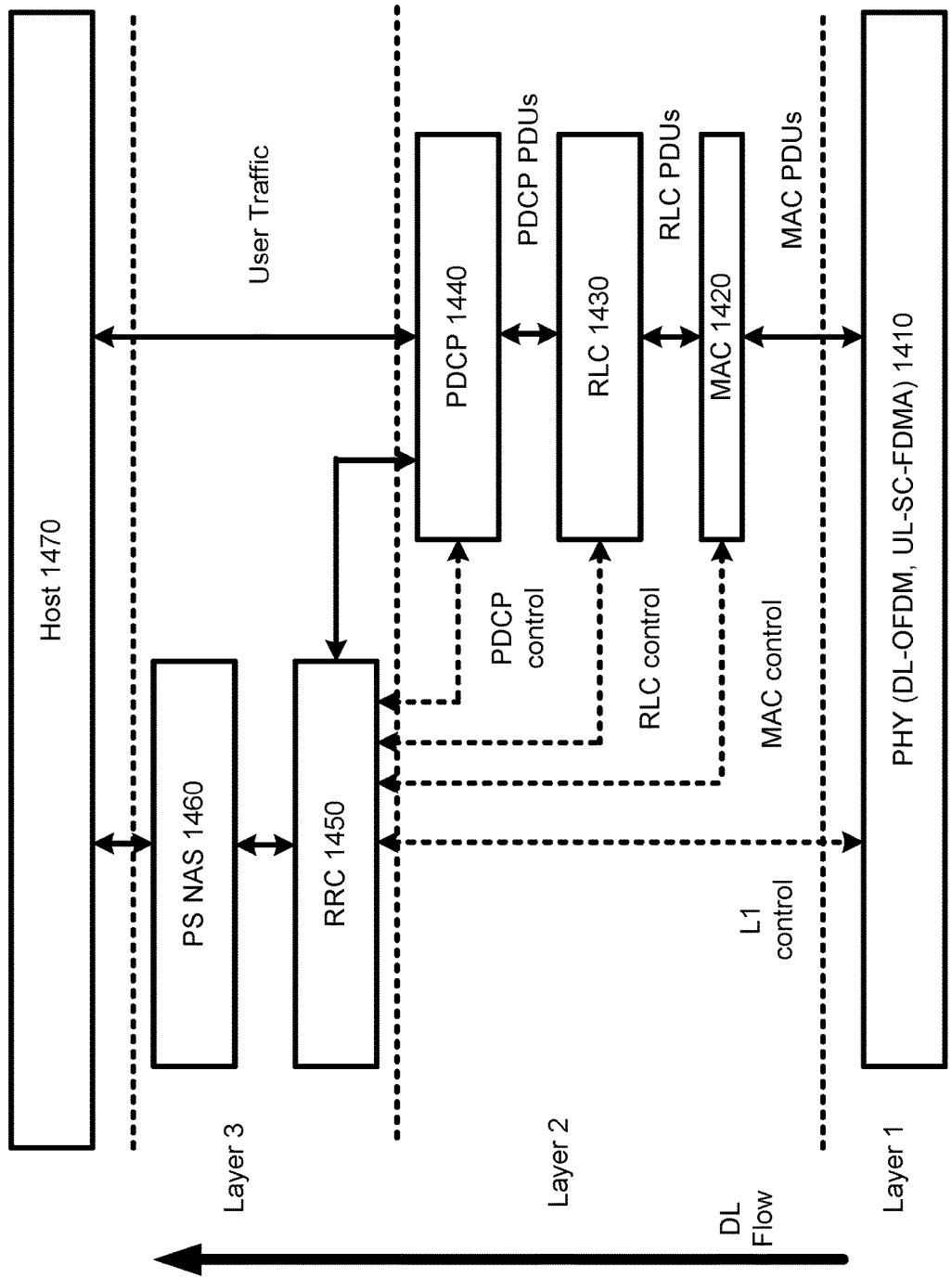
FIG. 14a illustrates a long term evolution (LTE) downlink (DL) radio protocol stack in accordance with an example.
Figure 14B:
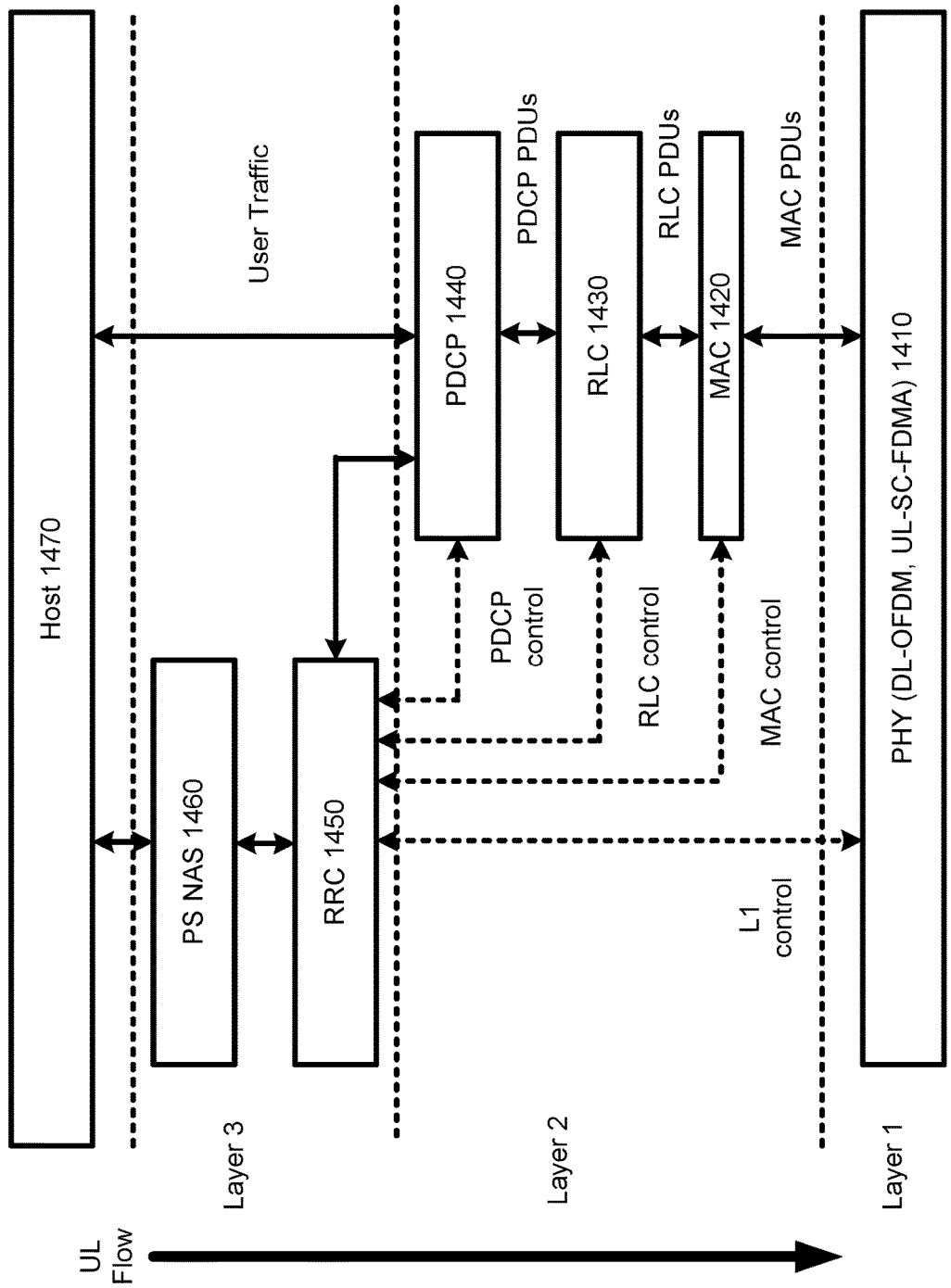
FIG. 14b illustrates a long term evolution (LTE) uplink (UL) radio protocol stack in accordance with an example.

In another example, as illustrated in FIGS. 14a and 14b, a downlink direction can progress from layer 1 to layer 3 and an uplink direction can progress from layer 3 to layer 1. In a DL direction, information can flow from the physical (PHY) layer 1410 to the medium-access control (MAC) layer 1420 to the radio link control (RLC) layer 1430, to the packet data convergence protocol (PDCP) layer 1440, and to the host 1470. Information can also flow from the physical layer 1410 to the radio resource control (RRC) layer 1450 to the non-access stratum (NAS) 1460, and to the host 1470. Control information can also flow from the PHY 1410, MAC 1420, RLC 1430, and PDCP 1440 to the RRC 1450. In an UL direction, information can flow in the opposite direction.

Layer 1 of the LTE stack can support: (i) DL and UL parameters (e.g., resource blocks, subcarriers per resource block, and subcarrier bandwidth), (ii) physical parameters (e.g., cyclic prefix (CP) length), (iii) 3GPP operation bands (e.g. FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the MAC layer, the RLC layer, the PDCP layer. Layer 3 of the LTE stack can include the RRC layer and the NAS layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In another example, the scanning receiver can further comprise memory configured to store a list of the one or more frequency ranges. In another example, the scanning receiver can comprise a field programmable gate array (FPGA). The FPGA can include supporting circuitry. In another example, the scanning receiver can comprise an application-specific integrated circuit (ASIC).

In another example, a repeater system can comprise a repeater and a scanning receiver. The repeater can comprise a first port, a second port, and one or more amplification and filtering paths coupled between the first port and the second port. The repeater can further comprise one or more processors and memory configured to receive, from the scanning receiver, cellular carrier specific information for one or more frequency ranges of a plurality of cellular carriers. The one or more processor can be further configured to communicate cellular carrier specific information of a plurality of cellular carriers for display. The repeater can be a narrow-band repeater, a wide-band repeater, or a cellular-carrier specific repeater. The repeater can be compatible with regulations defined for consumer signal boosters. The regulations defined for consumer signal boosters can include 47 Code of Federal Regulations (C.F.R.) Part 20.21 (Apr. 18, 2018).

In another example, the repeater system can further comprise a first display including one or more of: an integrated display, a mobile display, or a remote display.

In another example, the repeater can be configured to associate the cellular carrier specific information with the one or more cellular carriers. In another example, the repeater can be configured to communicate the cellular-carrier specific information for transmission and storage of the cellular-carrier specific information in a private computer server in a cloud computing environment. In another example, the repeater can be configured to provide the cellular carrier specific information for display.

EXAMPLES

The following examples pertain to specific technology embodiments and point out specific features, elements, or actions that can be used or otherwise combined in achieving such embodiments.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for controlling n-band repeater services by a cloud-computing environment, comprising:
   determining cellular carrier specific information for one or more bands in an n-band repeater;
   communicating the cellular carrier specific information for the n-band repeater to a computer server in a cloud-computing environment; and
   controlling the n-band repeater by the cloud-computing environment.

2. The method of claim 1, further comprising:
   controlling the n-band repeater by the cloud-computing environment using one or more encryption keys associated with a subscription service.

3. The method of claim 1, further comprising:
   receiving the one or more bands of the n-band repeater in a received signal.

4. The method of claim 1, further comprising:
   coupling the one or more bands to a scanning receiver.

5. The method of claim 1, further comprising:
   controlling display of the cellular carrier specific information using one or more encryption keys associated with a subscription service.

6. The method of claim 1, further comprising:
   displaying the cellular carrier-specific information for the one or more bands on a first display.

7. The method of claim 6, wherein the first display is one or more of:
   an integrated display,
   a mobile display, or
   a remote display.

8. The method of claim 1, further comprising:
   determining a first level of control of selected functions of the n-band repeater by the computer server of the cloud-computing environment.

9. The method of claim 1, further comprising:
   communicating the cellular carrier specific information to a second display in communication with the computer server of the cloud-computing environment.

10. The method of claim 1, wherein the cellular carrier specific information for the one or more bands includes one or more of:
  a cellular carrier name;
  one or more operating frequencies;
  one or more channels;
  a direction of a cell tower from the n-band repeater;
  a location of a cell tower;
  a time and date of a transmission;
  a reference signal received power (RSRP);
  a reference signal received quality (RSRQ);
  a received signal strength indicator (RSSI);
  an arbitrary strength unit (ASU);
  a reference signal (RS) signal to noise ratio (SNR) (RSSNR);
  a Evolved-UMTS Terrestrial Radio Access Network (E-UTRAN) cell identifier (ECI);
  a tracking area code (TAC);
  a physical cell identifier (PCI);
  automatic gain control (AGC) information for control of the n-band repeater;
  antenna steering information for control of one or more antennas associated with the n-band repeater; or
  antenna positioning information for control of a position of one or more antennas associated with the n-band repeater.

11. The method of claim 1, further comprising:
providing controllable functions including one or more of:
  a position of one or more antennas associated with the n-band repeater;
  a repeater gain of the n-band repeater;
  an activation or deactivation of one or more of a donor port of the n-band repeater or a server port of the n-band repeater;
  an activation or deactivation of one or more amplification and filtering paths for one or more operating bands of the n-band repeater, wherein the operating bands include one or more of a Third Generation Partnership Project (3GPP) long term evolution (LTE) frequency band or a 3GPP fifth generation (5G) frequency band;
  an increase or decrease of a repeater output power of the n-band repeater;
  an increase or decrease of a network protection level of the n-band repeater;
  an activation or deactivation of one or more cellular carriers associated with the n-band repeater;
  a filtering of one or more channels of one or more of a 3GPP LTE frequency band or a 3GPP 5G frequency band to provide filtering for the one or more channels; or
  a channel selection, an operating band selection, or a cellular carrier gain level based on a time of a day.

12. The method of claim 1, further comprising:
providing services by the computer server in the cloud-computing environment including one or more of:
  a retrieval of cell signal logs or statistics for one or more of a 3GPP LTE frequency band or a 3GPP 5G frequency band;
  an identification of one or more of a donor port cellular carrier frequency, a server port cellular carrier frequency, a reference signal received power (RSRP), a reference signal received quality (RSRQ), or a signal to interference-plus-noise ratio (SINR);
  a monitoring of one or more of in-band radio frequency (RF) activity or adjacent band RF activity;
  a firmware update of the n-band repeater; or
  a monitoring of uninterruptible power source (UPS) logs.

13. A repeater system configured to control services by a cloud-computing environment, the repeater system comprising:
  an n-band repeater, wherein n is a positive integer greater than 0;
  a server port;
  a donor port;
  one or more processors and memory in communication with the n-band repeater;
  a controller in communication with the one or more processors and memory and the cloud-computing environment, wherein the controller is operable to control services by a computer server in the cloud-computing environment; and
  a scanning receiver coupled to the one or more processors and memory, wherein the scanning receiver is configured to scan one or more of the n bands of the n-band repeater and communicate cellular carrier-specific information for the one or more of the n bands to the computer server located in the cloud-computing environment to enable access to the cellular carrier-specific information from the cloud-computing environment.

14. The repeater system of claim 13, wherein the cellular carrier-specific information includes cellular carrier-specific information for a plurality of cellular carriers in each band of the one or more of the n bands.

15. The repeater system of claim 13, wherein the controller is operable to control which functions are controlled by the computer server in the cloud-computing environment using one or more encryption keys, wherein each encryption key is granted a predetermined level of access to control services provided by the repeater system and monitor the repeater system by the cloud-computing environment.

16. The repeater system of claim 13, wherein the n-band repeater is a cellular repeater that is compatible with regulations defined for consumer signal boosters.

17. A repeater system configured to control services by a cloud-computing environment, the repeater system comprising:
  an n-band repeater;
  a server port;
  a donor port;
  one or more processors and memory in communication with the n-band repeater; and
  a controller in communication with the one or more processors and memory and the cloud-computing environment, wherein the controller is operable to control a plurality of services provided by a computer server in the cloud-computing environment using one or more encryption keys;
  a scanning receiver coupled to the one or more processors and memory, wherein the scanning receiver is configured to scan one or more of n bands of the n-band repeater and communicate cellular carrier specific information for the one or more of the n bands to the computer server located in the cloud-computing environment.

18. The repeater system of claim 17, wherein the n-band repeater is a cellular repeater that is compatible with regulations defined for consumer signal boosters.

19. The repeater system of claim 17, further comprising a first display in communication with the one or more processors and memory, and configured to display cellular carrier-specific information for the n-band repeater.

20. The repeater system of claim 19, wherein the first display is one or more of:
an integrated display,
a mobile display, or
a remote display.

21. The repeater system of claim 17, wherein the controller is configured to send for display:
a first level of information of cellular carrier-specific information for one or more bands of the n-band repeater using a first encryption key of the one or more encryption keys.

22. The repeater system of claim 17, wherein the controller is configured to provide:
a first level of control of selected functions of the repeater by the computer server of the cloud-computing environment.

23. The repeater system of claim 17, wherein the controller is further configured to provide:
access to a level of information of cellular carrier-specific information for one or more bands of the n-band repeater based on one or more of: a username and password authentication, or a permission level associated with the username and password authentication; or
access to a level of control of selected functions of the repeater by the computer server of the cloud-computing environment based on one or more of: the username and password authentication, or the permission level associated with the username and password authentication.

24. The repeater system of claim 19, wherein the first display is a touch-screen display configured to display the cellular carrier-specific information for the n-band repeater and enable control of the n-band repeater.

25. The repeater system of claim 17, wherein the cellular carrier specific information for one or more bands of the n-band repeater includes one or more of:
a cellular carrier name;
one or more operating frequencies;
one or more channels;
a direction of a cell tower from the n-band repeater;
a location of a cell tower;
a time and date of a transmission;
a reference signal received power (RSRP);
a reference signal received quality (RSRQ);
a received signal strength indicator (RSSI);
an arbitrary strength unit (ASU);
a reference signal (RS) signal to noise ratio (SNR) (RSSNR);
a Evolved-UMTS Terrestrial Radio Access Network (E-UTRAN) cell identifier (ECI);
a physical cell identifier (PCI);
a tracking area code (TAC);
automatic gain control (AGC) information for control of the n-band repeater;
antenna steering information for control of one or more antennas associated with the n-band repeater; or
antenna positioning information for control of a position of one or more antennas associated with the n-band repeater.

26. The repeater system of claim 17, wherein the services controlled by the computer server in the cloud-computing environment comprise controllable functions including one or more of:
a position of one or more antennas associated with the n-band repeater;
a repeater gain of the n-band repeater;
an activation or deactivation of one or more of a donor port of the n-band repeater or a server port of the n-band repeater;
an activation or deactivation of one or more amplification and filtering paths for one or more operating bands of the n-band repeater, wherein the operating bands include one or more of a Third Generation Partnership Project (3GPP) long term evolution (LTE) frequency band or a 3GPP fifth generation (5G) frequency band;
an increase or decrease of a repeater output power of the n-band repeater;
an increase or decrease of a network protection level of the n-band repeater;
an activation or deactivation of one or more cellular carriers associated with the n-band repeater;
a filtering of one or more channels of one or more of a 3GPP LTE frequency band or a 3GPP 5G frequency band to provide filtering for the one or more channels; or
a channel selection, an operating band selection, or a cellular carrier gain level based on a time of a day.

27. The repeater system of claim 17, wherein the services controlled by the computer server in the cloud-computing environment include one or more of:
a retrieval of cell signal logs or statistics for one or more of a 3GPP LTE frequency band or a 3GPP 5G frequency band;
an identification of one or more of a donor port cellular carrier frequency, a server port cellular carrier frequency, a reference signal received power (RSRP), a reference signal received quality (RSRQ), or a signal to interference-plus-noise ratio (SINR);
a monitoring of one or more of in-band radio frequency (RF) activity or adjacent band RF activity;
a firmware update of the n-band repeater; or
a monitoring of uninterruptible power source (UPS) logs.

28. The repeater system of claim 17, wherein the n-band repeater is a wideband repeater.

* * * * *